(12) United States Patent
Zhu et al.

(10) Patent No.: US 11,038,846 B2
(45) Date of Patent: Jun. 15, 2021

(54) INTERNET PROTOCOL SECURITY TUNNEL MAINTENANCE METHOD, APPARATUS, AND SYSTEM

(71) Applicant: Huawei Technologies Co., Ltd., Shenzhen (CN)

(72) Inventors: Xiaoming Zhu, Hangzhou (CN); Wenxin Bai, Hangzhou (CN); Jin Kong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 80 days.

(21) Appl. No.: 16/564,327

(22) Filed: Sep. 9, 2019

(65) Prior Publication Data
US 2020/0007507 A1 Jan. 2, 2020

Related U.S. Application Data

(63) Continuation of application No. PCT/CN2017/112357, filed on Nov. 22, 2017.

(30) Foreign Application Priority Data

Mar. 10, 2017 (CN) .......... 201710140192.X

(51) Int. Cl.
*H04L 29/06* (2006.01)
*H04L 12/66* (2006.01)
*H04L 12/46* (2006.01)

(52) U.S. Cl.
CPC ...... *H04L 63/0272* (2013.01); *H04L 12/4633* (2013.01); *H04L 12/66* (2013.01); *H04L 29/06* (2013.01); *H04L 63/061* (2013.01)

(58) Field of Classification Search
CPC ..... H04L 63/0272; H04L 12/66; H04L 29/06; H04L 63/061; H04L 63/0485
See application file for complete search history.

(56) References Cited

U.S. PATENT DOCUMENTS

2005/0198691 A1 9/2005 Xiang et al.
2016/0197884 A1 7/2016 May
(Continued)

FOREIGN PATENT DOCUMENTS

CN 102594646 A 7/2012
CN 102843368 A 12/2012
(Continued)

OTHER PUBLICATIONS

"APNIC eLearning: IPSec VPN Design"—APNIC, Aug. 2, 2017 https://ftp.apnic.net/apnic/training/eLearningHandouts/2017/20170802/20170802%20IPSec%20Basics.pdf (Year: 2017).*
(Continued)

*Primary Examiner* — Randy A Scott
(74) *Attorney, Agent, or Firm* — Conley Rose, P.C.

(57) ABSTRACT

An Internet Protocol Security tunnel maintenance method, apparatus, and system including a terminal device that negotiates with a VPN gateway based on a first IP address and according to the IKE protocol, and establishes an IPsec tunnel based on SAs obtained through negotiation; determines, the first IP address changes to a second IP address; sends a first request packet to the VPN gateway, where the first request packet carries the second IP address and a first tunnel identifier, where the first request packet is used to request to update a first SA record, and where the first SA record includes a correspondence between the SAs, the first IP address, and the first tunnel identifier; generates a second tunnel identifier based on the second IP address and a predefined algorithm; and replaces the first tunnel identifier in a second SA record with the second tunnel identifier.

20 Claims, 10 Drawing Sheets

(56) References Cited

U.S. PATENT DOCUMENTS

2016/0302110 A1\* 10/2016 Baboescu ............ H04L 12/4633
2019/0260608 A1    8/2019 Baboescu et al.

FOREIGN PATENT DOCUMENTS

| CN | 105376239 A | \* | 3/2016 |
| CN | 105376239 A |    | 3/2016 |
| CN | 106411676 A |    | 2/2017 |
| CN | 105376239 B |    | 1/2019 |

OTHER PUBLICATIONS

Machine Translation and Abstract of Chinese Publication No. CN102594646, Jul. 18, 2012, 14 pages.
Machine Translation and Abstract of Chinese Publication No. CN105376239, Jan. 18, 2019, 17 pages.
Machine Translation and Abstract of Chinese Publication No. CN105376239, Mar. 2, 2016, 17 pages.
Foreign Communication From a Counterpart Application, PCT Application No. PCT/CN2017/112357, English Translation of International Search Report dated Dec. 25, 2017, 2 pages.
Foreign Communication From a Counterpart Application, PCT Application No. PCT/CN2017/112357, English Translation of Written Opinion dated Dec. 25, 2017, 5 pages.

\* cited by examiner

INTERNET PROTOCOL SECURITY TUNNEL MAINTENANCE METHOD, APPARATUS, AND SYSTEM

CROSS-REFERENCE TO RELATED APPLICATIONS

This application is a continuation application of International Application No. PCT/CN2017/112357, filed on Nov. 22, 2017, which claims priority to Chinese Patent Application No. 201710140192.X, filed on Mar. 10, 2017. The disclosures of the aforementioned applications are hereby incorporated by reference in their entireties.

TECHNICAL FIELD

This application relates to the field of communications technologies, and in particular, to an Internet Protocol Security (IPsec) tunnel maintenance method, apparatus, and system.

BACKGROUND

The IPsec protocol is a layer 3 tunnel encryption protocol, and is a security technology that can implement a virtual private network (VPN). An IPsec tunnel is established between a terminal device and a VPN gateway, to protect and transmit private data of a user, and provide internet (IP)-layer security services, such as data confidentiality, data integrity, data source authentication, and anti-replay.

The IPsec tunnel is established according to the Internet Key Exchange (IKE) protocol. Two communication parties determine, through two stages of IKE negotiation, a security association (SA) required by the IPsec tunnel. In an embodiment, the two communication parties perform first-stage IKE negotiation to determine an IKE SA, and then perform second-stage IKE negotiation under protection of the IKE SA to determine an IPsec SA. The SA is an agreement between the terminal device and the VPN gateway on some transmission parameters. Examples of the transmission parameters are a security protocol, an algorithm, and an encapsulation mode that are used, a type of a protected data flow, a life cycle of a used key, and the like. After negotiation on the IPsec SA is completed, a to-be-sent IP packet between the terminal device and the VPN gateway is encapsulated by using a tunnel and based on the IPsec SA obtained through negotiation, that is, the IPsec tunnel is established. Therefore, the two communication parties transmit the to-be-transmitted IP packet on the IPsec tunnel in an encrypted manner.

The two communication parties usually store, in a one-to-one correspondence manner, the SAs (including the IKE SA and the IPsec SA) corresponding to the IPsec tunnel, and 5-tuple information (including a source IP address, a destination IP address, a source port number, a destination port number, and a protocol) of the IP packet transmitted on the IPsec tunnel. In an IP packet transmission process, a receive end searches for the corresponding SAs usually by using the 5-tuple information, and when determining that the corresponding SAs exist, decrypts the IP packet by using the IPsec SA in the SAs. If there is no SA corresponding to the 5-tuple information, the receive end discards the IP packet. Therefore, when an IP address of the terminal device changes due to a factor such as a location change, the 5-tuple information of the to-be-transmitted IP packet on the IPsec tunnel also changes. After receiving an IP packet carrying changed 5-tuple information, the VPN gateway discards the IP packet sent by the terminal device, because there is no SA corresponding to the changed 5-tuple information. On the other hand, when sending an IP packet to the terminal device, the VPN gateway encapsulates, based on the before-change 5-tuple information corresponding to the SA, the packet sent to the terminal device. Therefore, when the IP address of the terminal device changes, the VPN gateway still sends the IP packet to the old IP address, and therefore cannot send the IP packet to the terminal device. In other words, the established IPsec tunnel becomes unavailable because the IP address of the terminal device changes, and consequently, a service provided by the VPN gateway for the terminal device is interrupted.

SUMMARY

This application provides an IPsec tunnel maintenance method, apparatus, and system in order to resolve a problem that a service provided by a VPN gateway for a terminal device is interrupted when an IP address of the terminal device changes, because an IPsec tunnel is unavailable.

According to a first aspect, this application provides an IPsec tunnel maintenance method, where the method includes negotiating, by a terminal device, with a virtual private network VPN gateway based on a first Internet Protocol IP address of the terminal device and according to the Internet Key Exchange IKE protocol, and establishing an IPsec tunnel between the terminal device and the VPN gateway based on security associations SAs obtained through negotiation, where the SAs include an IKE SA and an IPsec SA; determining, by the terminal device, that an IP address of the terminal device changes from the first IP address to a second IP address; sending, by the terminal device, a first request packet to the VPN gateway, where the first request packet carries the second IP address and a first tunnel identifier, the first tunnel identifier is a tunnel identifier generated based on the first IP address, the first request packet is used to request the VPN gateway to update a first SA record based on the second IP address, the first SA record is stored in the VPN gateway, and the first SA record includes a correspondence between the SAs, the first IP address, and the first tunnel identifier; generating, by the terminal device, a second tunnel identifier based on the second IP address and a predefined algorithm, where the predefined algorithm is the same as an algorithm used by the VPN gateway to generate the first tunnel identifier; and replacing, by the terminal device, the first tunnel identifier in a second SA record with the second tunnel identifier, where the second SA record is stored in the terminal device, and the second SA record stores a correspondence between the SAs and the first tunnel identifier.

According to the IPsec tunnel maintenance method provided in this application, when the IP address of the terminal device changes to the second IP address, the terminal device sends, to the VPN gateway, the first request packet carrying the new second IP address and the first tunnel identifier, so that after finding the first SA record based on the first tunnel identifier, the VPN gateway replaces, based on the second IP address, the first tunnel identifier and the first IP address in the first SA record with the second tunnel identifier and the second IP address. In addition, the terminal device also replaces, based on the second IP address, the first tunnel identifier in the second SA record with the second tunnel identifier. Therefore, when subsequently sending an IP packet to the VPN gateway, the terminal device may add the second tunnel identifier to the IP packet, so that when the IP address of the terminal changes, the VPN gateway can find the corresponding first SA record based on the second tunnel identifier, and obtain, from the first SA record, the SAs corresponding to the IPsec tunnel established between the VPN gateway and the terminal device, and the VPN gateway can continue to use the SAs to decrypt the IP packet. In other words, it is ensured that the IPsec tunnel established between the terminal device and the VPN gateway is still available. Therefore, a new IPsec tunnel does not need to be established by obtaining new SAs through negotiation, and continuity and integrity of a service provided by the VPN gateway for the terminal device are ensured.

In a possible design, after the replacing, by the terminal device, the first tunnel identifier in a second SA record with the second tunnel identifier, the method further includes waiting, by the terminal device, to receive a first answer message sent by the VPN gateway; and if the terminal device receives the first answer message sent by the VPN gateway, and the first answer message carries the second tunnel identifier, determining, by the terminal device, that the VPN gateway has completed updating the first SA record; or if the terminal device does not receive, within a preset time period, the first answer message sent by the VPN gateway, or the received first answer message does not carry the second tunnel identifier, re-sending, by the terminal device, the first request packet to the VPN gateway.

In this possible design, the terminal device determines whether the first answer message carrying the second tunnel identifier is received, to determine whether the VPN gateway has completed updating the first SA record. When determining that the first answer message carrying the second tunnel identifier is not received, the terminal device may re-send the first request packet to the VPN gateway, to re-request the VPN gateway to update the first SA record in order to improve a success rate for the VPN gateway to complete updating the first SA record when the IP address of the terminal device changes.

In a possible design, after the establishing an IPsec tunnel between the terminal device and the VPN gateway, and before the determining, by the terminal device, that an IP address of the terminal device changes from the first IP address to a second IP address, the method further includes receiving, by the terminal device on the IPsec tunnel, an encrypted first IP packet sent by the VPN gateway, where the encrypted first IP packet carries the first tunnel identifier; searching, by the terminal device, for the second SA record based on the first tunnel identifier, and obtaining the IPsec SA in the second SA record; and decrypting, by the terminal device, the encrypted first IP packet based on the IPsec SA, to obtain data in the first IP packet.

In a possible design, after the establishing an IPsec tunnel between the terminal device and the VPN gateway, and before the determining, by the terminal device, that an IP address of the terminal device changes from the first IP address to a second IP address, the method further includes encrypting, by the terminal device, a second IP packet based on the IPsec SA in the second SA record; and sending, by the terminal device, an encrypted second IP packet to the VPN gateway on the IPsec tunnel, where the encrypted second IP packet carries the first tunnel identifier.

In the foregoing two possible designs, both the terminal device and the VPN gateway search, by using the first tunnel identifier carried in transmitted IP packets (including the first IP packet and the second IP packet), for the SAs corresponding to the IPsec tunnel. Therefore, even if the IP address of the terminal device changes, a corresponding SA record can also be found by using the first tunnel identifier in order to obtain the IPsec SA that is corresponding to the IPsec and that is in the SA record. This avoids the following problem in other approaches. When a SA corresponding to an IPsec tunnel is searched for by using 5-tuple information in a transmitted IP packet, because an IP address of a terminal device changes, the 5-tuple information changes, the SA corresponding to the IPsec tunnel cannot be found, the established IPsec tunnel becomes unavailable, and a service provided by a VPN gateway for the terminal device is interrupted.

In a possible design, the negotiating, by a terminal device, with a VPN gateway based on a first IP address of the terminal device and according to the IKE protocol includes, after obtaining the IKE SA through negotiation, and before negotiating on the IPsec SA based on the IKE SA, sending, by the terminal device, a second request packet to the VPN gateway, where the second request packet includes the first IP address, and the second request packet is used to request the VPN gateway to create the first SA record based on the first IP address, and add the first IP address to the first SA record; generating, by the terminal device, the first tunnel identifier based on the first IP address and the predefined algorithm; and creating, by the terminal device, the second SA record, and adding the first tunnel identifier to the second SA record.

In this possible design, in a process of establishing the IPsec tunnel, the terminal device and the VPN gateway create SA records (including the first SA record and the second SA record) related to the IPsec tunnel, to record the first tunnel identifier and the SAs corresponding to the IPsec tunnel. Therefore, when the terminal device and the VPN gateway subsequently transmit an IP packet, the terminal device and the VPN gateway may search for a corresponding SA record based on the first tunnel identifier carried in the IP packet, and obtain the SAs corresponding to the IPsec tunnel. This resolves a problem in other approaches that because an IP address of a terminal device changes, 5-tuple information of an IP packet changes, and a VPN gateway cannot find a SA corresponding to an IPsec tunnel and therefore interrupts a service for the terminal device.

In a possible design, the second request packet is a request packet based on a mode configuration mechanism, and the creating, by the terminal device, the second SA record, and adding the first tunnel identifier to the second SA record includes waiting, by the terminal device, to receive a second answer message sent by the VPN gateway; and if the terminal device receives the second answer message sent by the VPN gateway, and the second answer message carries the first tunnel identifier, creating, by the terminal device, the second SA record, and adding the first tunnel identifier to the second SA record.

In this possible design, the terminal device creates the second SA record only when the VPN gateway supports the mode configuration mechanism. By using the second request packet based on the mode configuration mechanism, an existing IKE negotiation process does not need to be changed, and the IPsec tunnel maintenance method provided in this application is compatible with the existing IKE negotiation process.

According to a second aspect, this application provides an IPsec tunnel maintenance method, where the method includes negotiating, by a virtual private network VPN gateway, with a terminal device based on a first IP address of the terminal device and according to the Internet Key Exchange IKE protocol, and establishing an IPsec tunnel between the VPN gateway and the terminal device based on security associations SAs obtained through negotiation, where the SAs include an IKE SA and an IPsec SA;

receiving, by the VPN gateway, a first request packet sent by the terminal device, where the first request packet carries a second IP address and a first tunnel identifier; searching, by the VPN gateway, for a first SA record based on the first tunnel identifier, where the first SA record includes a correspondence between the first tunnel identifier, the first IP address, and the SAs; generating, by the VPN gateway, a second tunnel identifier based on the second IP address and a predefined algorithm, where the predefined algorithm is the same as an algorithm used by the terminal device to generate the second tunnel identifier; and replacing, by the VPN gateway, the first tunnel identifier in the first SA record with the second tunnel identifier, and replacing the first IP address in the first SA record with the second IP address.

According to the IPsec tunnel maintenance method provided in this application, when the IP address of the terminal device changes to the second IP address, the terminal device sends, to the VPN gateway, the first request packet carrying the new second IP address and the first tunnel identifier, so that after finding the first SA record based on the first tunnel identifier, the VPN gateway replaces, based on the second IP address, the first tunnel identifier and the first IP address in the first SA record with the second tunnel identifier and the second IP address. In addition, the terminal device also replaces, based on the first IP address, the first tunnel identifier in the second SA record with the second tunnel identifier. Therefore, when subsequently sending an IP packet to the VPN gateway, the terminal device may add the second tunnel identifier to the IP packet, so that when the IP address of the terminal changes, the VPN gateway can find the corresponding first SA record based on the second tunnel identifier, and obtain, from the first SA record, the SAs corresponding to the IPsec tunnel established between the VPN gateway and the terminal device, and the VPN gateway can continue to use the SAs to decrypt the IP packet. In other words, it is ensured that the IPsec tunnel established between the terminal device and the VPN gateway is still available. Therefore, a new IPsec tunnel does not need to be established by obtaining new SAs through negotiation, and continuity and integrity of a service provided by the VPN gateway for the terminal device are ensured.

In a possible design, after the replacing, by the VPN gateway, the first tunnel identifier in the first SA record with the second tunnel identifier, and replacing the first IP address in the first SA record with the second IP address, the method further includes generating, by the VPN gateway, a first answer message, where the first answer message carries the second tunnel identifier; setting, by the VPN gateway, an IP header for the first answer message based on the second IP address; and sending, by the VPN gateway, the first answer message to the terminal device on the IPsec tunnel.

In this possible design, the terminal device determines whether the first answer message carrying the second tunnel identifier is received, to determine whether the VPN gateway has completed updating the first SA record. When determining that the first answer message carrying the second tunnel identifier is not received, the terminal device may re-send the first request packet to the VPN gateway, to re-request the VPN gateway to update the first SA record in order to improve a success rate for the VPN gateway to complete updating the first SA record when the IP address of the terminal device changes.

In a possible design, after the establishing an IPsec tunnel between the VPN gateway and the terminal device, and before the receiving, by the VPN gateway, a first request packet sent by the terminal device, the method further includes, when the VPN gateway needs to send a first IP packet to the terminal device, searching, by the VPN gateway, for the first SA record based on the first tunnel identifier; encrypting, by the VPN gateway, the first IP packet based on the IPsec SA in the first SA record; setting, by the VPN gateway, an IP header for an encrypted first IP packet based on the first IP address in the first SA record; and sending, by the VPN gateway, the encrypted first IP packet to the terminal device on the IPsec tunnel, where the encrypted first IP packet carries the first tunnel identifier.

In a possible design, after the establishing an IPsec tunnel between the VPN gateway and the terminal device, and before the receiving, by the VPN gateway, a first request packet sent by the terminal device, the method further includes receiving, by the VPN gateway on the IPsec tunnel, an encrypted second IP packet sent by the terminal device, where the encrypted second IP packet carries the first tunnel identifier; searching, by the VPN gateway, for the first SA record based on the first tunnel identifier; and decrypting, by the VPN gateway, the encrypted second IP packet based on the IPsec SA in the first SA record, to obtain data in the second IP packet.

In the foregoing two possible designs, both the terminal device and the VPN gateway search, by using the first tunnel identifier carried in transmitted IP packets (including the first IP packet and the second IP packet), for the SAs corresponding to the IPsec tunnel. Therefore, even if the IP address of the terminal device changes, a corresponding SA record can also be found by using the first tunnel identifier in order to obtain the IPsec SA that is corresponding to the IPsec and that is in the SA record. This avoids the following problem in other approaches. When a SA corresponding to the IPsec tunnel is searched for by using 5-tuple information in a transmitted IP packet, because an IP address of a terminal device changes, the 5-tuple information changes, the SA corresponding to the IPsec tunnel cannot be found, the established IPsec tunnel becomes unavailable, and a service provided by a VPN gateway for the terminal device is interrupted.

In a possible design, the negotiating, by a VPN gateway, with a terminal device based on a first IP address of the terminal device and according to the IKE protocol includes, after obtaining the IKE SA through negotiation, and before negotiating on the IPsec SA based on the IKE SA, receiving, by the VPN gateway, a second request packet sent by the terminal device, where the second request packet includes the first IP address; generating, by the VPN gateway, the first tunnel identifier based on the first IP address and the predefined algorithm; and creating, by the VPN gateway, the first SA record, and adding the first tunnel identifier and the first IP address to the first SA record.

In this possible design, in a process of establishing the IPsec tunnel, the terminal device and the VPN gateway create SA records (including the first SA record and the second SA record) related to the IPsec tunnel, to record the first tunnel identifier and the SAs corresponding to the IPsec tunnel. Therefore, when the terminal device and the VPN gateway subsequently transmit an IP packet, the terminal device and the VPN gateway may search for a corresponding SA record based on the first tunnel identifier carried in the IP packet, and obtain the SAs corresponding to the IPsec tunnel. This resolves a problem in other approaches that because an IP address of a terminal device changes, 5-tuple information of an IP packet changes, and a VPN gateway cannot find a SA corresponding to an IPsec tunnel and therefore interrupts a service for the terminal device.

In a possible design, the second request packet is a request message based on a mode configuration mechanism, and the generating, by the VPN gateway, the first tunnel identifier based on the first IP address and the predefined algorithm includes determining, by the VPN gateway, whether the mode configuration mechanism is supported; if the VPN gateway supports the mode configuration mechanism, generating, by the VPN gateway, the first tunnel identifier based on the first IP address and the predefined algorithm; and sending, by the VPN gateway, a second answer message to the terminal device, where the second answer message includes the first tunnel identifier.

In this possible design, the VPN gateway creates the first SA record only when the VPN gateway supports the mode configuration mechanism. By using the second request packet based on the mode configuration mechanism, an existing IKE negotiation process does not need to be changed, and the IPsec tunnel maintenance method provided in this application is compatible with the existing IKE negotiation process.

According to a third aspect, this application provides a terminal device, including a processing unit configured to negotiate with a virtual private network VPN gateway based on a first Internet Protocol IP address of the terminal device and according to the Internet Key Exchange IKE protocol, and establish an Internet Protocol Security IPsec tunnel between the terminal device and the VPN gateway based on security associations SAs obtained through negotiation, where the SAs include an IKE SA and an IPsec SA, where the processing unit is further configured to determine that an IP address of the terminal device changes from the first IP address to a second IP address; and a sending unit configured to send a first request packet to the VPN gateway, where the first request packet carries the second IP address and a first tunnel identifier, the first tunnel identifier is a tunnel identifier generated based on the first IP address, the first request packet is used to request the VPN gateway to update a first SA record based on the second IP address, the first SA record is stored in the VPN gateway, and the first SA record includes a correspondence between the SAs, the first IP address, and the first tunnel identifier, where the processing unit is further configured to generate a second tunnel identifier based on the second IP address and a predefined algorithm, where the predefined algorithm is the same as an algorithm used by the VPN gateway to generate the first tunnel identifier; and the processing unit is further configured to replace the first tunnel identifier in a second SA record with the second tunnel identifier, where the second SA record is stored in the terminal device, and the second SA record stores a correspondence between the SAs and the first tunnel identifier.

In a possible design, the terminal device further includes a receiving unit, where the receiving unit is configured to, after the processing unit replaces the first tunnel identifier in the second SA record with the second tunnel identifier, wait to receive a first answer message sent by the VPN gateway; and if the first answer message sent by the VPN gateway is received, and the first answer message carries the second tunnel identifier, determine that the VPN gateway has completed updating the first SA record; and the sending unit is further configured to, if the receiving unit does not receive, within a preset time period, the first answer message sent by the VPN gateway, or the received first answer message does not carry the second tunnel identifier, re-send the first request packet to the VPN gateway.

In a possible design, the receiving unit is further configured to, after the IPsec tunnel between the terminal device and the VPN gateway is established, and before it is determined that the IP address of the terminal device changes from the first IP address to the second IP address, receive, on the IPsec tunnel, an encrypted first IP packet sent by the VPN gateway, where the encrypted first IP packet carries the first tunnel identifier; the processing unit is further configured to search for the second SA record based on the first tunnel identifier, and obtain the IPsec SA in the second SA record; and the processing unit is further configured to decrypt the encrypted first IP packet based on the IPsec SA, to obtain data in the first IP packet.

In a possible design, the processing unit is further configured to, after establishing the IPsec tunnel between the terminal device and the VPN gateway, and before determining that the IP address of the terminal device changes from the first IP address to the second IP address, encrypt a second IP packet based on the IPsec SA in the second SA record; and the sending unit is further configured to send an encrypted second IP packet to the VPN gateway on the IPsec tunnel, where the encrypted second IP packet carries the first tunnel identifier.

In a possible design, the negotiating, by a processing unit, with a VPN gateway based on a first IP address of the terminal device and according to the IKE protocol includes, after obtaining the IKE SA through negotiation, and before negotiating on the IPsec SA based on the IKE SA, sending a second request packet to the VPN gateway, generating the first tunnel identifier based on the first IP address and the predefined algorithm, creating the second SA record, and adding the first tunnel identifier to the second SA record, where the second request packet includes the first IP address, and the second request packet is used to request the VPN gateway to create the first SA record based on the first IP address, and add the first IP address to the first SA record.

In a possible design, the second request packet is a request packet based on a mode configuration mechanism, and the creating, by the processing unit, the second SA record, and adding the first tunnel identifier to the second SA record includes waiting to receive a second answer message sent by the VPN gateway; and if the second answer message sent by the VPN gateway is received, and the second answer message carries the first tunnel identifier, creating the second SA record, and adding the first tunnel identifier to the second SA record.

For technical effects of the terminal device provided in this application, refer to technical effects of the first aspect or the implementations of the first aspect. Details are not described herein again.

According to a fourth aspect, this application provides a VPN gateway, including a processing unit configured to negotiate with a terminal device based on a first Internet Protocol IP address of the terminal device and according to the Internet Key Exchange IKE protocol, and establish an Internet Protocol Security IPsec tunnel between the VPN gateway and the terminal device based on security associations SAs obtained through negotiation, where the SAs include an IKE SA and an IPsec SA; and a receiving unit configured to receive a first request packet sent by the terminal device, where the first request packet carries a second IP address and a first tunnel identifier, where the processing unit is further configured to search for a first SA record based on the first tunnel identifier, where the first SA record includes a correspondence between the first tunnel identifier, the first IP address, and the SAs; the processing unit is further configured to generate a second tunnel identifier based on the second IP address and a predefined algorithm, where the predefined algorithm is the same as an algorithm used by the terminal device to generate the second tunnel identifier; and the processing unit is further configured to replace the first tunnel identifier in the first SA record with the second tunnel identifier, and replace the first IP address in the first SA record with the second IP address.

In a possible design, the VPN gateway further includes a sending unit, where the processing unit is further configured to, after replacing the first tunnel identifier in the first SA record with the second tunnel identifier, and replacing the first IP address in the first SA record with the second IP address, generate a first answer message, where the first answer message carries the second tunnel identifier; the processing unit is further configured to set an IP header for the first answer message based on the second IP address; and the sending unit is configured to send the first answer message to the terminal device on the IPsec tunnel.

In a possible design, the processing unit is further configured to, after establishing the IPsec tunnel between the VPN gateway and the terminal device, and before the receiving unit receives the first request packet sent by the terminal device, when a first IP packet needs to be sent to the terminal device, search for the first SA record based on the first tunnel identifier; the processing unit is further configured to encrypt the first IP packet based on the IPsec SA in the first SA record; the processing unit is further configured to set an IP header for an encrypted first IP packet based on the first IP address in the first SA record; and the sending unit is further configured to send the encrypted first IP packet to the terminal device on the IPsec tunnel, where the encrypted first IP packet carries the first tunnel identifier.

In a possible design, the receiving unit is further configured to, after the processing unit establishes the IPsec tunnel between the VPN gateway and the terminal device, and before receiving the first request packet sent by the terminal device, receive, on the IPsec tunnel, an encrypted second IP packet sent by the terminal device, where the encrypted second IP packet carries the first tunnel identifier; the processing unit is further configured to search for the first SA record based on the first tunnel identifier; and the processing unit is further configured to decrypt the encrypted second IP packet based on the IPsec SA in the first SA record, to obtain data in the second IP packet.

In a possible design, the negotiating, by a processing unit, with a terminal device based on a first IP address of the terminal device and according to the IKE protocol includes, after obtaining the IKE SA through negotiation, and before negotiating on the IPsec SA based on the IKE SA, receiving a second request packet sent by the terminal device, where the second request packet includes the first IP address; generating the first tunnel identifier based on the first IP address and the predefined algorithm; and creating the first SA record, and adding the first tunnel identifier and the first IP address to the first SA record.

In a possible design, the second request packet is a request message based on a mode configuration mechanism, and the generating, by the processing unit, the first tunnel identifier based on the first IP address and the predefined algorithm includes determining whether the VPN gateway supports the mode configuration mechanism; if the VPN gateway supports the mode configuration mechanism, generating the first tunnel identifier based on the first IP address and the predefined algorithm; and sending a second answer message to the terminal device, where the second answer message includes the first tunnel identifier.

For technical effects of the VPN gateway provided in this application, refer to technical effects of the second aspect or the implementations of the second aspect. Details are not described herein again.

According to a fifth aspect, this application further provides a terminal device, including a processor, a memory, and a transceiver, where the processor may execute a program or an instruction stored in the memory, to implement the IPsec tunnel maintenance method according to any one of the first aspect or the implementations of the first aspect.

For technical effects of the terminal device provided in this application, refer to technical effects of the first aspect or any one of the second aspect or the implementations of the second aspect. Details are not described herein again.

According to a sixth aspect, this application further provides a VPN gateway, including a processor, a memory, and a transceiver, where the processor may execute a program or an instruction stored in the memory, to implement the IPsec tunnel maintenance method according to the implementations of the second aspect.

For technical effects of the VPN gateway provided in this application, refer to technical effects of the second aspect or the implementations of the second aspect. Details are not described herein again.

According to a seventh aspect, this application further provides a computer-readable storage medium, where the computer-readable storage medium stores an instruction, and when the instruction runs on a computer, the computer is enabled to perform the methods according to the foregoing aspects.

According to an eighth aspect, this application further provides a computer program product including an instruction, where when the computer program product runs on a computer, the computer is enabled to perform the methods according to the foregoing aspects.

According to a ninth aspect, this application further provides a communications system, including the terminal device according to the third aspect or any implementation of the third aspect, and the VPN gateway according to the fourth aspect or any implementation of the fourth aspect; or including the terminal device according to the fifth aspect or any implementation of the fifth aspect, and the VPN gateway according to the sixth aspect or any implementation of the sixth aspect.

DESCRIPTION OF EMBODIMENTS

A character "I" in this specification usually indicates an "or" relationship between associated objects. A term "and/or" in this specification describes only an association relationship for describing associated objects and represents that three relationships may exist. For example, A and/or B may represent the following three cases. Only A exists, both A and B exist, and only B exists.

When an ordinal numeral such as "first", "second", "third", or "fourth" is mentioned in embodiments of the present disclosure, it should be understood that the ordinal numeral is merely intended for differentiation, unless the ordinal numeral really indicates a sequence based on a context.

Figure 1:
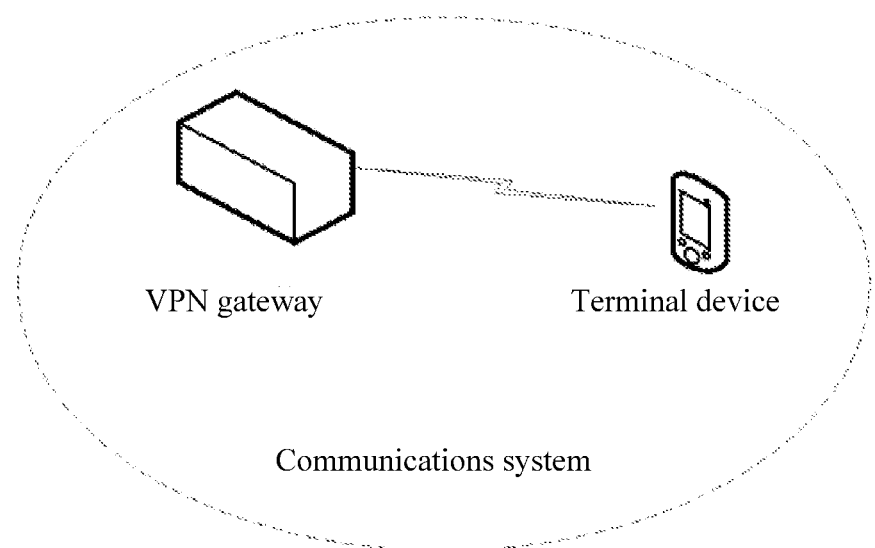
FIG. 1 is a block diagram of a communications system according to this application.

As shown in FIG. 1, an IPsec tunnel maintenance method provided in this application may be applied to a communications system including a VPN gateway and a terminal device. The terminal device in this application may include various devices that have a wireless communication function, for example, a handheld device, an in-vehicle device, a wearable device, a computing device, or another processing device connected to a wireless modem; a communications node on a household appliance, a medical device, an industrial device, an agricultural device, an aeronautical device, or the like; or various forms of user equipments (UE), mobile stations (MS), terminals, terminal devices, or the like. For ease of description, in this application, the aforementioned devices are collectively referred to as a terminal device.

Usually, a VPN may be implemented by using software, hardware, or system integration. In this application, the terminal device implements, by using VPN client software installed on the terminal device, the IPsec tunnel maintenance method provided in this application. The VPN client software is software designed in compliance with a VPN standard. Various VPN service providers or VPN gateway device providers provide users with VPN client software applicable to different operating system platforms, such as Linux, Windows, and Android.

The VPN gateway in this application may be a device having an IPsec function, such as a router, a layer 3 switch, a firewall, or a security gateway (for example, Unified Threat Management (UTM)). These devices may implement a function of the VPN gateway by installing VPN server software or by using hardware integration.

Figure 2:
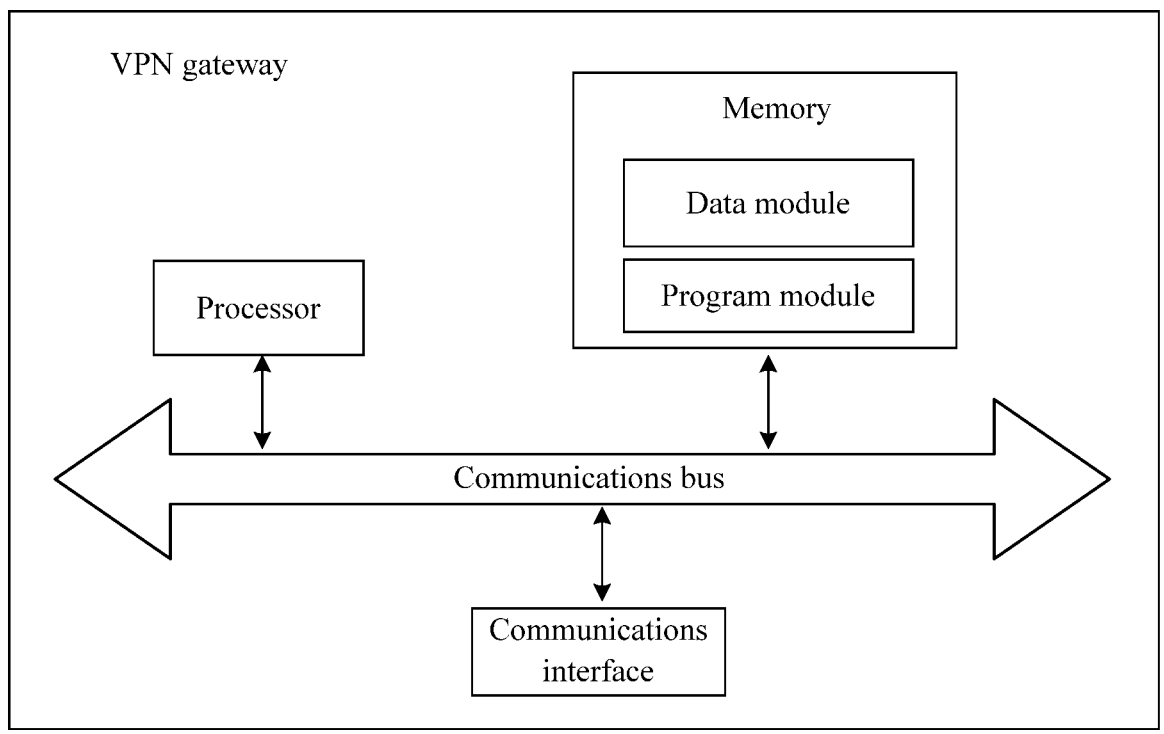
FIG. 2 is a schematic structural diagram 1 of a VPN gateway according to this application.

For example, FIG. 2 is a schematic structural diagram of a VPN gateway according to this application. The VPN gateway may include a memory, a processor, a bus, and a communications interface.

The bus is configured to connect the processor, the memory, and the communications interface, and implement data transmission between the processor, the memory, and the communications interface. The processor receives a command from the communications interface by using the bus, decrypts the received command, performs computing or data processing according to a decrypted command, and sends processed data to another device through the communications interface by using the bus. The memory includes a program module, a data module, and the like. The program module may include software, firmware, hardware, or at least two of software, firmware, and hardware, and is configured to store an application program and an operating system. The communications interface is configured to connect the VPN gateway to a network, and a network element node such as a base station or a terminal device. For example, the communications interface may be wirelessly connected to the network in order to be connected to another external network element node.

Figure 3:
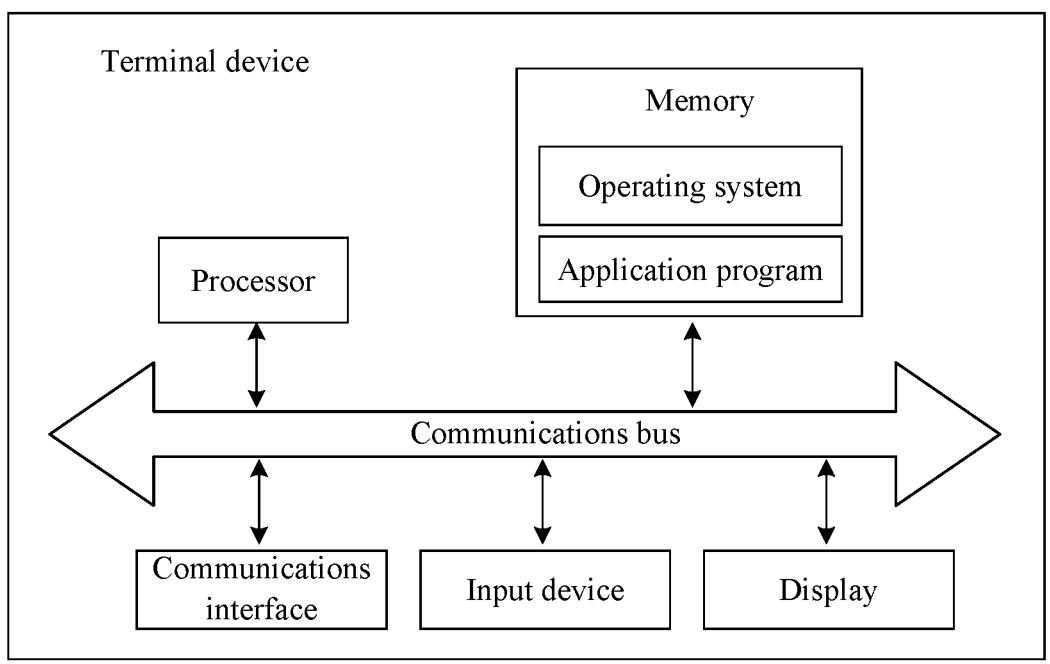
FIG. 3 is a schematic structural diagram 1 of a terminal device according to this application.

FIG. 3 is a schematic structural diagram of a terminal device according to this application. The terminal device includes a processor, a memory, a communications interface, and the like.

The processor is a control center of the terminal device, connects various parts of the entire terminal device by using various interfaces and lines, and executes various functions and data processing of the terminal device by running or executing an application program and/or an operating system stored in the memory and invoking data stored in the memory in order to perform overall monitoring on the terminal device. The processor may include a digital signal processor device, a microprocessor device, an analog-to-digital converter, a digital-to-analog converter, and the like. Control and signal processing functions of the terminal device can be allocated to these devices based on capabilities of the devices. The communications interface may be an RF circuit, and may be configured to send or receive information, and send received information to the processor for processing. Usually, the RF circuit includes but is not limited to an antenna, at least one amplifier, a transceiver, a coupler, an LNA (low noise amplifier, low noise amplifier), a duplexer, and the like, and communicates with a network and another device through wireless communication. Any communications standard or protocol may be used for the wireless communication, including but not limited to Global System for Mobile Communications (GSM), General Packet Radio Service (GPRS), Code Division Multiple Access (CDMA), Wideband Code Division Multiple Access (WCDMA), Long Term Evolution (LTE), Wi-Fi or low-power Wi-Fi, a WLAN technology, and the like. In addition, the terminal device may further include an input/output device, a display, and the like.

Figure 4:
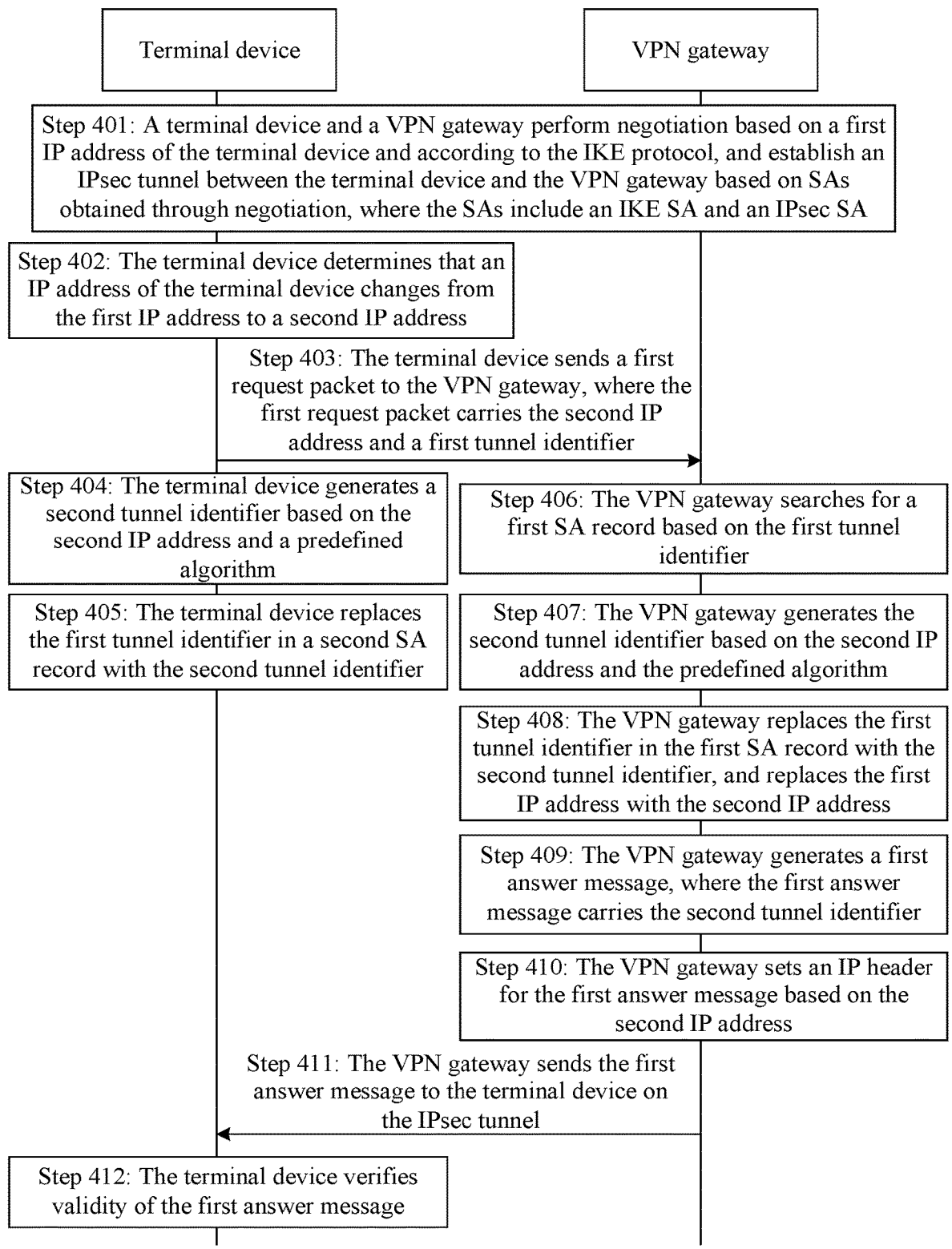
FIG. 4 is a flowchart of an embodiment of an IPsec tunnel maintenance method according to this application.

Based on the communications system shown in FIG. 1, FIG. 4 is a flowchart of an embodiment of an IPsec tunnel maintenance method according to this application. The method includes the following steps.

Step 401: A terminal device and a VPN gateway perform negotiation based on a first IP address of the terminal device and according to the IKE protocol, and establish an IPsec tunnel between the terminal device and the VPN gateway based on SAs obtained through negotiation, where the SAs include an IKE SA and an IPsec SA.

It may be understood that the negotiation performed by the terminal device and the VPN gateway based on the first IP address of the terminal device and according to the IKE protocol includes two stages of IKE negotiation, for example, performing first-stage IKE negotiation to obtain the IKE SA, and performing second-stage IKE negotiation under protection of the IKE SA to obtain the IPsec SA.

In this application, in a process of performing the two stages of IKE negotiation by the terminal device and the VPN, in an embodiment, in a time period after the first-stage negotiation is completed and before the second-stage negotiation is completed, the terminal device and the VPN gateway may generate, based on the first IP address, a first tunnel identifier that can uniquely identify the IPsec tunnel that is to be successfully established; and create a corresponding SA record, where the SA record is used to record the SAs corresponding to the IP sec tunnel.

For ease of description, in this application, a SA record that is corresponding to the IPsec tunnel and that is stored in the VPN gateway may be referred to as a first SA record. The first SA record includes a correspondence between the SAs of the IPsec tunnel, the first IP address, and the first tunnel identifier. A SA record that is corresponding to the IPsec tunnel and that is stored in the terminal device is referred to as a second SA record. The second SA record includes a correspondence between the SAs of the IPsec tunnel and the first tunnel identifier.

Step 402: The terminal device determines that an IP address of the terminal device changes from the first IP address to a second IP address.

After the IPsec tunnel between the terminal device and the VPN gateway is successfully established, the terminal device may start to periodically detect whether the IP address of the terminal device changes. For example, the terminal device may preset a timer. Each time the timer expires, the terminal device may check whether a value of the IP address in a registry of the terminal device is the same as a value viewed last time. If the values are different, the terminal device may determine that the IP address changes.

Step 403: The terminal device sends a first request packet to the VPN gateway, where the first request packet carries the second IP address and a first tunnel identifier.

The first request packet is used to request the VPN gateway to update the first SA record based on the second IP address.

When the IP address of the terminal device changes, the terminal device may add the first tunnel identifier to the first request packet, so that the VPN gateway can find, based on the first tunnel identifier, the first SA record including the first tunnel identifier, and the VPN gateway may update the first SA record based on a new IP address. This avoids a problem that the VPN gateway cannot find the SAs of the established IPsec tunnel because the IP address of the terminal device changes.

Step 404: The terminal device generates a second tunnel identifier based on the second IP address and a predefined algorithm.

The algorithm used by the terminal device is the same as an algorithm used by the VPN gateway to generate the second tunnel identifier, thereby ensuring that the terminal device and the VPN gateway can generate the same second tunnel identifier.

For example, the algorithm may be a hash-based message authentication code (HMAC). A key used to generate the second tunnel identifier by using the HMAC algorithm may be SKEYID_e: a key generated when the terminal device and the VPN gateway perform the first-stage IKE negotiation.

The predefined algorithm may alternatively be a message digest 5 (MD5) algorithm, a secure hash algorithm (SHA) 1, an SHA2, or the like.

Optionally, the terminal device may further use another parameter to generate the second tunnel identifier, for example, an international mobile subscriber identity (IMSI) of the terminal device, a globally unique temporary identity (GUTI) of the terminal device, or a parameter, including a nonce (Nonce) and the like, generated when the terminal device and the VPN gateway perform the first-stage IKE negotiation.

It may be understood that, if the terminal device further uses the another parameter to generate the second tunnel identifier, the VPN gateway device also uses the same parameter to generate the second tunnel identifier.

Step 405: The terminal device replaces the first tunnel identifier in a second SA record with the second tunnel identifier.

In this application, when the IP address of the terminal device changes, the terminal device may generate a new tunnel identifier (namely, the second tunnel identifier) based on a new IP address (namely, the second IP address), and replaces the first tunnel identifier specified in the second SA record with the second tunnel identifier. Therefore, in a subsequent IP packet transmission process, the second tunnel identifier can be used to uniquely identify the IPsec tunnel. In an embodiment, after the IP address of the terminal device changes, the terminal device can search for the corresponding second SA record by using the second tunnel identifier, to obtain the SAs of the established IPsec tunnel in the second SA record; and continue to use the SAs to transmit an IP packet, to ensure that the established IPsec tunnel is still available.

It should be noted that the operations of the terminal device in steps 401 to 405 may be performed by the processor of the terminal device shown in FIG. 2.

Step 406: The VPN gateway searches for a first SA record based on the first tunnel identifier.

After receiving the first request packet, the VPN gateway may first verify the first tunnel identifier, a destination IP address, an IPsec protocol, and a security parameter index (SPI) in the first request packet, to detect validity and integrity of the first request packet. If the verification succeeds, the VPN gateway searches, based on the first tunnel identifier, for the first SA record including the first tunnel identifier.

Step 407: The VPN gateway generates the second tunnel identifier based on the second IP address and the predefined algorithm.

After finding the first SA record, the VPN gateway may generate a new tunnel identifier, namely, the second tunnel identifier, based on the second IP address carried in the first request packet. It may be understood that an implementation of generating, by the VPN gateway, the second tunnel identifier based on the second IP address and the predefined algorithm is the same as an implementation of generating, by the terminal device, the second tunnel identifier based on the second IP address and the predefined algorithm. For details, refer to related descriptions in step 404. Details are not described herein again.

Step 408: The VPN gateway replaces the first tunnel identifier in the first SA record with the second tunnel identifier, and replaces the first IP address with the second IP address.

In this application, the terminal device sends, to the VPN gateway, the first request packet carrying a new IP address and an old tunnel identifier (namely, the first tunnel identifier that is generated based on the first IP address and that is set in the current first SA record), to request the VPN gateway to update the first SA record. This implements negotiation on the new IP address and a new tunnel identifier between the VPN gateway and the terminal device.

After generating the second tunnel identifier based on the second IP address, the VPN gateway may update the first SA record, to replace the first tunnel identifier and the first IP address in the first SA record with the second tunnel identifier and the second IP address. Therefore, when sending an IP packet to the VPN gateway, the terminal device may add the second tunnel identifier to the IP packet such that when the IP address of the terminal changes, the VPN gateway can search for the corresponding first SA record based on the second tunnel identifier, obtain, from the first SA record, the SAs corresponding to the established IPsec tunnel, and decrypt the IP packet by using the SAs. In addition, when the VPN gateway sends an IP packet to the terminal device, the VPN gateway can find, based on the second tunnel identifier, the second IP address updated in the first SA record, and send the IP packet to the terminal device.

It may be understood that, according to the IPsec tunnel maintenance method provided in this application, when the IP address of the terminal device changes, a new IPsec tunnel does not need to be established by obtaining new SAs through negotiation between the VPN gateway and the terminal device. A tunnel identifier in a corresponding SA record only needs to be updated such that the terminal device and the VPN gateway can subsequently transmit an IP packet still by using a SA that is in the SA record and that is corresponding to an established IPsec tunnel. This avoids service interruption.

Optionally, in this application, after updating the first SA record, the VPN gateway may further send, to the terminal device, a first answer message carrying the second tunnel identifier such that the terminal device determines that the VPN gateway has completed updating the first SA record. For example, after step 407, the method further includes the following steps.

Step 409: The VPN gateway generates a first answer message, where the first answer message carries the second tunnel identifier.

Step 410: The VPN gateway sets an IP header for the first answer message based on the second IP address.

It may be understood that, after the VPN gateway updates the first SA record, the VPN gateway may use a new IP address to set the IP header for the first answer message to be sent to the terminal device such that the VPN gateway can send the first answer message to the new IP address, in other words, a destination IP address of the first answer message is set to the second IP address, thereby ensuring that the terminal device can receive the first answer message.

Step 411: The VPN gateway sends the first answer message to the terminal device on the IPsec tunnel.

Step 412: The terminal device verifies validity of the first answer message.

In this application, after replacing the first tunnel identifier in the second SA record with the second tunnel identifier, the terminal device may wait to receive the first answer message sent by the VPN gateway.

If receiving the first answer message, the terminal device may verify the validity of the first answer message, in an embodiment, verify a tunnel identifier in the first answer message, and determine whether the tunnel identifier carried in the first answer message is the same as the second tunnel identifier in the second SA record. If the tunnel identifier is the same as the second tunnel identifier, the first answer message is valid, and the terminal device may determine that the VPN gateway has completed updating the first SA record.

If the terminal device does not receive, within a preset time period, the first answer message sent by the VPN gateway, or the received first answer message does not carry the second tunnel identifier (in other words, the first answer message carries a tunnel identifier different from the second tunnel identifier, or carries an error payload), the terminal device re-sends the first request packet to the VPN gateway.

Figure 5A:
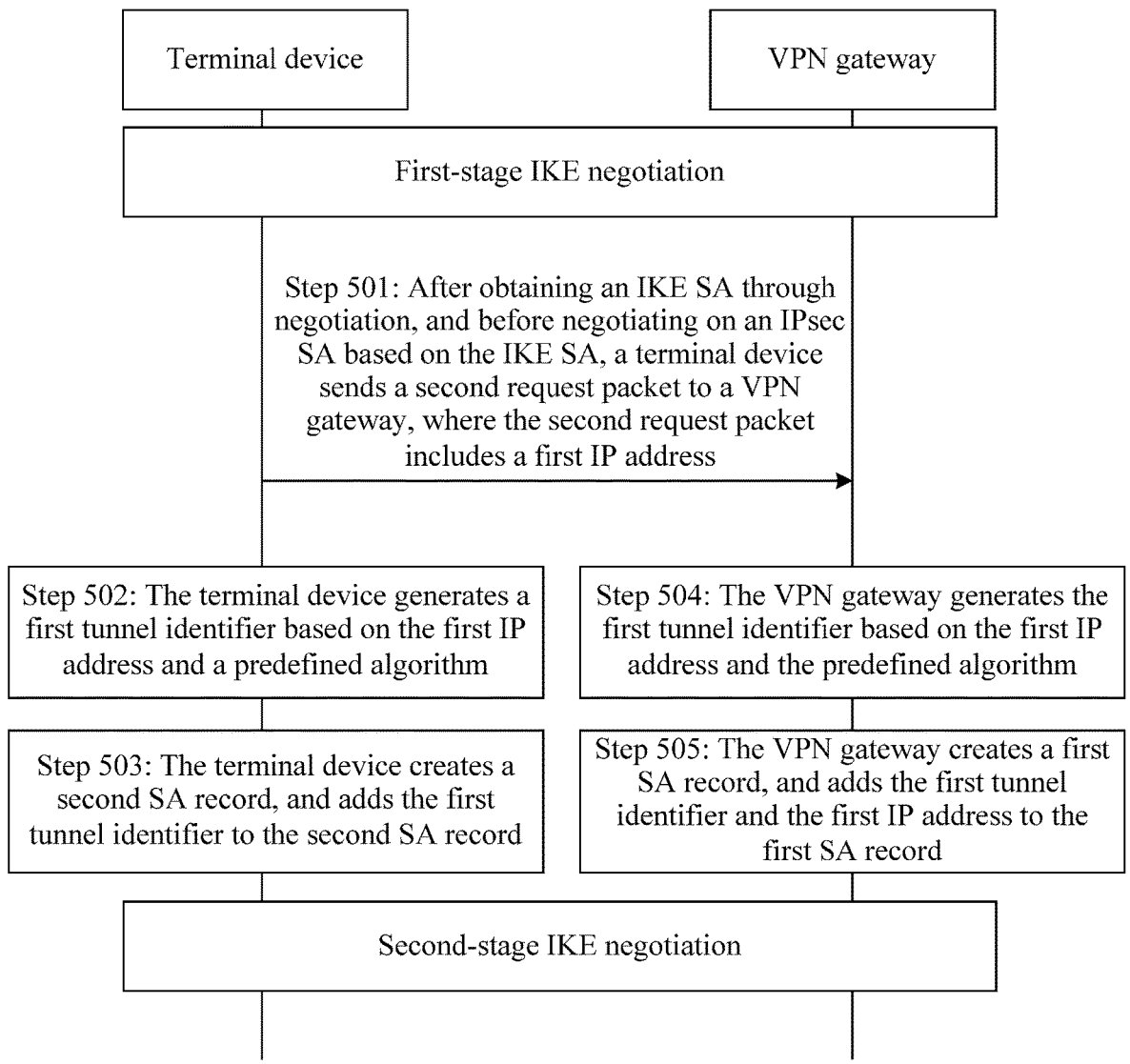
FIG. 5A is a flowchart of another embodiment of an IPsec tunnel maintenance method according to this application.

FIG. 5A is a flowchart of another embodiment of an IPsec tunnel maintenance method according to this application, and describes a method for establishing the IPsec tunnel by the VPN gateway and the terminal device, namely, an implementation of step 401. The method may include the following steps.

Step 501: After obtaining the IKE SA through negotiation, and before negotiating on the IPsec SA based on the IKE SA, the terminal device sends a second request packet to the VPN gateway, where the second request packet includes the first IP address.

After obtaining the IKE SA by performing the first-stage IKE negotiation with the VPN gateway, the terminal device may first send the second request packet to the VPN gateway. The second request packet is used to request the VPN gateway to create the first SA record based on the first IP address, and add the first IP address to the first SA record.

In an example, an initial negotiation tunnel identifier (for example, an identifier whose value is 0) may be carried in the second request packet, to indicate that a request of the second request packet is a first tunnel identifier negotiation request performed after the IPsec tunnel is established. Therefore, after generating the first tunnel identifier, the VPN gateway can perform an action of creating the first SA record and adding, to the first SA record, the first IP address corresponding to the first tunnel identifier. For example, the initial negotiation tunnel identifier may be carried in a private payload of an attribute payload of the second request packet.

Step 502: The terminal device generates the first tunnel identifier based on the first IP address and the predefined algorithm.

A manner (including an algorithm and another parameter that are used) of generating the first tunnel identifier is completely the same as a manner of generating the second tunnel identifier. Details are not described herein again.

Step 503: The terminal device creates the second SA record, and adds the first tunnel identifier to the second SA record.

It may be understood that the second SA record is used by the terminal device to record the tunnel between the terminal device and the VPN gateway. In this case, the second SA record includes the first tunnel identifier and the IKE SA obtained through negotiation. After obtaining the IPsec SA by performing the second-stage IKE negotiation under protection of the IKE SA, the terminal device may add the IPsec SA to the second SA record.

Step 504: The VPN gateway generates the first tunnel identifier based on the first IP address and the predefined algorithm.

Step 505: The VPN gateway creates the first SA record, and adds the first tunnel identifier and the first IP address to the first SA record.

Likewise, it may be understood that the second SA record is used by the terminal device to record the tunnel between the terminal device and the VPN gateway. In this case, the second SA record includes the first tunnel identifier and the IKE SA obtained through negotiation. After obtaining the IPsec SA by performing the second-stage IKE negotiation under protection of the IKE SA, the terminal device may add the IPsec SA to the second SA record.

Optionally, the second request packet may be a request packet based on a mode configuration mechanism. The mode configuration mechanism is an Internet Security Association and Key Management Protocol (ISAKMP) configuration method proposed by the Internet Engineering Task Force (IETF). The ISAKMP configuration method is usually referred to as a mode configuration or a virtual identity. The mode configuration allows two parties that establish an IPsec tunnel to securely exchange a configuration entry in a SA negotiation process. Configuration entries include internal IP address pools, Domain Name System (DNS), server IP addresses, internal network basic input/output system (NetBIOS) protocol name server IP addresses, internal Dynamic Host Configuration Protocol (DHCP) server IP addresses, and the like of the two parties.

By using the second request packet based on the mode configuration mechanism, an existing IKE negotiation process does not need to be changed, and the IPsec tunnel maintenance method provided in this application is compatible with the existing IKE negotiation process.

Figure 5B:
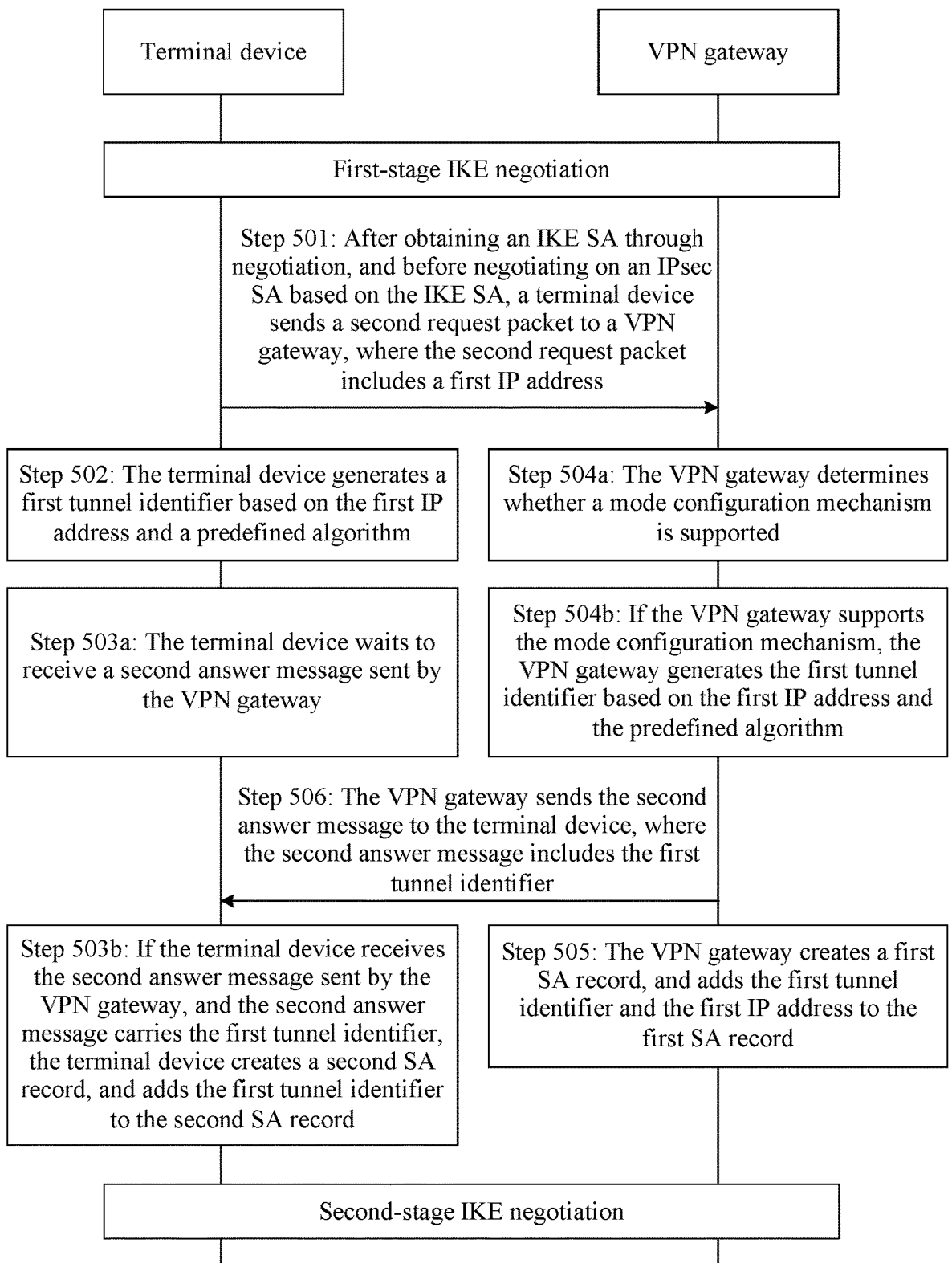
FIG. 5B is a flowchart of still another embodiment of an IPsec tunnel maintenance method according to this application.

When the second request packet is a request packet based on the mode configuration mechanism, based on FIG. 5A, referring to FIG. 5B, step 504 may include the following steps:

Step 504a: The VPN gateway determines whether the mode configuration mechanism is supported.

For example, the VPN gateway may determine whether a packet type of the second request packet is a packet type supported by the VPN gateway, to determine whether the VPN gateway supports the mode configuration mechanism. It may be understood that, if the VPN gateway supports the packet type of the second request packet, the VPN gateway supports the mode configuration mechanism; or if the VPN gateway does not support the packet type of the second request packet, the VPN gateway does not support the mode configuration mechanism.

Step 504b: If the VPN gateway supports the mode configuration mechanism, the VPN gateway generates the first tunnel identifier based on the first IP address and the predefined algorithm.

In an embodiment, if the mode configuration mechanism is supported, the VPN gateway may perform operations requested by the second request packet including generating the first tunnel identifier and creating the first SA record.

After step 504b, the method further includes the following step.

Step 506: The VPN gateway sends a second answer message to the terminal device, where the second answer message includes the first tunnel identifier.

In this application, if the VPN gateway supports the mode configuration mechanism, after the first tunnel identifier is generated, the first tunnel identifier may be carried in the second answer message corresponding to the second request packet, and sent to the terminal device.

It should be noted that step 506 may be performed after step 504b and before step 505, or may be performed after step 505.

If the VPN gateway does not support the mode configuration mechanism, the VPN gateway may directly discard the second request packet; and not send the second answer message to the terminal device, or add an error payload to the second answer message.

After sending the second request packet based on the mode configuration mechanism to the VPN gateway and when performing step 503, the terminal device may perform the following operations.

Step 503a: The terminal device waits to receive the second answer message sent by the VPN gateway.

Step 503b: If the terminal device receives the second answer message sent by the VPN gateway, and the second answer message carries the first tunnel identifier, the terminal device creates the second SA record, and adds the first tunnel identifier to the second SA record.

In an embodiment, if the terminal device receives the second answer message carrying the first tunnel identifier, the terminal device may determine that the VPN gateway supports the mode configuration mechanism, and may further create the second SA record.

It may be understood that, if the terminal device does not receive the second answer message, or the received second answer message does not carry the first tunnel identifier, the terminal device determines that the VPN gateway does not support the mode configuration mechanism. Therefore the terminal device may delete the generated first tunnel identifier, and perform the second-stage IKE negotiation according to an existing procedure to complete establishing the IPsec tunnel, without performing step 503.

Optionally, the first request packet in the embodiment shown in FIG. 4 may also be a request packet based on the mode configuration. By using the first request packet based on the mode configuration, an existing data transmission process does not need to be changed, and the IPsec tunnel maintenance method provided in this application is compatible with the existing data transmission process.

Figure 6:
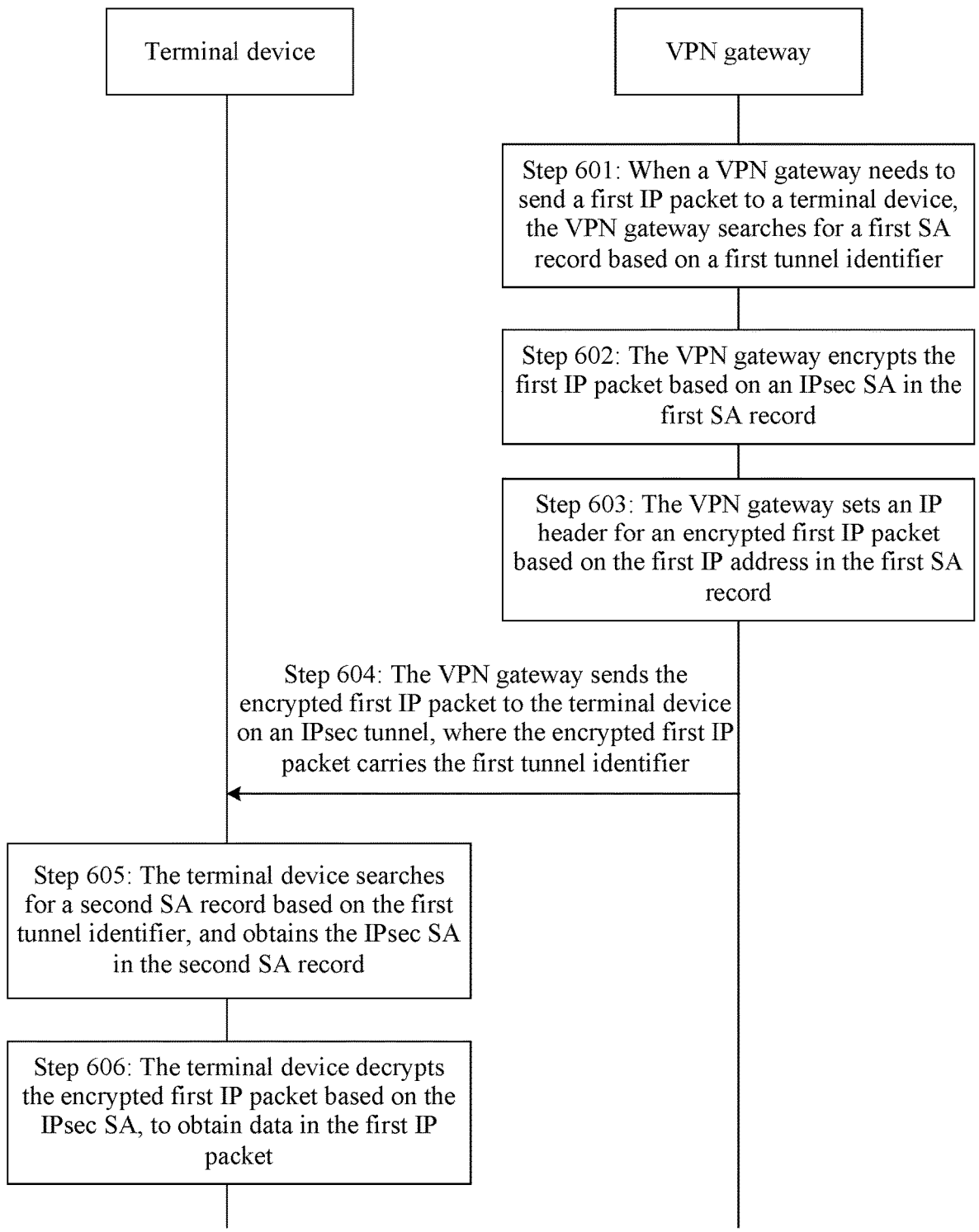
FIG. 6 is a flowchart of yet another embodiment of an IPsec tunnel maintenance method according to this application.

FIG. 6 is a flowchart of yet another embodiment of an IPsec tunnel maintenance method according to this application, and describes a method for sending, by the VPN gateway by using the IPsec tunnel, a first IP packet to the terminal device after the IPsec tunnel between the VPN gateway and the terminal device is established. For example, when the IP address of the terminal device is the first IP address, the method may include the following steps.

Step 601: When the VPN gateway needs to send the first IP packet to the terminal device, the VPN gateway searches for the first SA record based on the first tunnel identifier.

When the VPN gateway needs to send the first IP packet to the terminal device, the VPN gateway may first detect whether the first IP packet needs to be transmitted in an encrypted manner. If the first IP packet needs to be transmitted in the encrypted manner, the VPN gateway may search for the first SA record based on the first tunnel identifier.

Step 602: The VPN gateway encrypts the first IP packet based on the IPsec SA in the first SA record.

It may be understood that, if determining that the first IP packet needs to be encrypted, after finding the first SA record corresponding to the first tunnel identifier, the VPN gateway may encrypt the first IP packet based on an encryption mode, an authentication mode, an encryption key length, an integrity algorithm, or the like that is determined through negotiation between the VPN gateway and the terminal device and that is in the IPsec SA in the first SA record.

Step 603: The VPN gateway sets an IP header for an encrypted first IP packet based on the first IP address in the first SA record.

In an embodiment, in this application, when sending the encrypted first IP packet to the terminal device, the VPN gateway obtains the first IP address from the first SA record to set the IP header for the encrypted first IP packet. This ensures that the VPN gateway can send the first IP packet to a new IP address in a timely manner after the IP address of the terminal device changes, and avoids a problem that the VPN gateway cannot send the first IP packet to the terminal device because the first IP packet is sent to an old IP address.

Step 604: The VPN gateway sends the encrypted first IP packet to the terminal device on the IPsec tunnel, where the encrypted first IP packet carries the first tunnel identifier.

Step 605: The terminal device searches for the second SA record based on the first tunnel identifier, and obtains the IPsec SA in the second SA record.

Step 606: The terminal device decrypts the encrypted first IP packet based on the IPsec SA, to obtain data in the first IP packet.

In an embodiment, the terminal device decrypts the first IP packet by using the encryption mode, the authentication mode, the encryption key length, the integrity algorithm, or the like that is determined through negotiation between the terminal device and the VPN gateway and that is in the IPsec SA.

Figure 7:
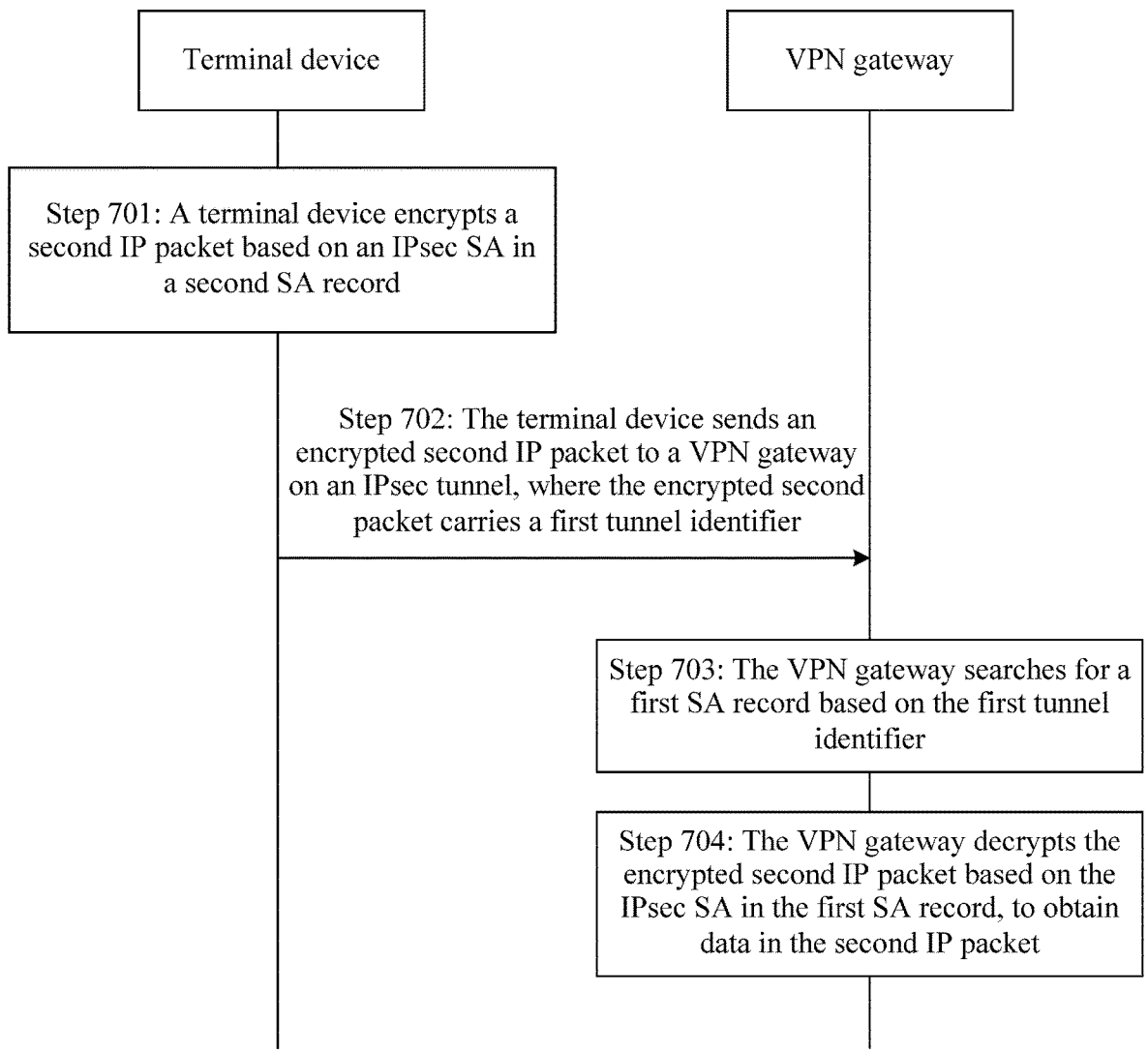
FIG. 7 is a flowchart of yet another embodiment of an IPsec tunnel maintenance method according to this application.

FIG. 7 is a flowchart of yet another embodiment of an IPsec tunnel maintenance method according to this application, and describes a method for sending, by the terminal device by using the IPsec tunnel, a second IP packet to the VPN gateway after the IPsec tunnel between the VPN gateway and the terminal device is established. For example, the method may include the following steps.

Step 701: The terminal device encrypts the second IP packet based on the IPsec SA in the second SA record.

When the terminal device needs to send an encrypted second IP packet to the VPN gateway, the terminal device may encrypt the first IP packet based on the encryption mode, the authentication mode, the encryption key length, the integrity algorithm, or the like that is determined through negotiation between the terminal device and the VPN gateway and that is in the IPsec SA.

Step 702: The terminal device sends an encrypted second IP packet to the VPN gateway on the IPsec tunnel, where the encrypted second IP packet carries the first tunnel identifier.

Step 703: The VPN gateway searches for the first SA record based on the first tunnel identifier.

After receiving the second IP packet, the VPN gateway may first verify the second IP packet. For example, it is assumed that the second IP packet is an ESP packet. After receiving the ESP packet, the VPN gateway may verify the ESP packet based on an SPI in an ESP header, and a destination IP address and an IPsec protocol in an IP header used by the ESP packet. If the verification succeeds, the VPN gateway searches, based on the first tunnel identifier, for the first SA record including the first tunnel identifier.

Step 704: The VPN gateway decrypts the encrypted second IP packet based on the IPsec SA in the first SA record, to obtain data in the second IP packet.

The embodiments shown in FIG. 6 and FIG. 7 describe methods for transmitting an IP packet by using an IPsec tunnel in this application. In this application, both the terminal device and the VPN gateway search, by using the first tunnel identifier carried in a transmitted IP packet, for a SA record corresponding to the first tunnel identifier, and obtain the SAs that are corresponding to the IPsec tunnel and that are in the SA record. Therefore, even if the IP address of the terminal device changes, the SAs corresponding to the IPsec tunnel can also be found by using the first tunnel identifier. This avoids the following problem in other approaches. When a SA corresponding to the IPsec tunnel is searched for by using 5-tuple information in a transmitted IP packet, because an IP address of a terminal device changes, the 5-tuple information changes, the SA corresponding to the IPsec tunnel cannot be found, the established IPsec tunnel becomes unavailable, and a service provided by a VPN gateway for the terminal device is interrupted.

It can be learned from the foregoing embodiments that, according to the IPsec tunnel maintenance method provided in this application, when the IP address of the terminal device changes to the second IP address, the terminal device sends, to the VPN gateway, the first request packet carrying the new second IP address and the first tunnel identifier such that after finding the first SA record based on the first tunnel identifier, the VPN gateway replaces, based on the second IP address, the first tunnel identifier and the first IP address in the first SA record with the second tunnel identifier and the second IP address. In addition, the terminal device also replaces, based on the first IP address, the first tunnel identifier in the second SA record with the second tunnel identifier. Therefore, when subsequently sending an IP packet to the VPN gateway, the terminal device may add the second tunnel identifier to the IP packet such that when the IP address of the terminal changes, the VPN gateway can find the corresponding first SA record based on the second tunnel identifier, and obtain, from the first SA record, the SAs corresponding to the IPsec tunnel established between the VPN gateway and the terminal device, and the VPN gateway can continue to use the SAs to decrypt the IP packet. In other words, it is ensured that the IPsec tunnel established between the terminal device and the VPN gateway is still available. Therefore, a new IPsec tunnel does not need to be established by obtaining new SAs through negotiation, and continuity and integrity of a service provided by the VPN gateway for the terminal device are ensured.

The foregoing describes the solutions provided in this application mainly from a perspective of interaction between network elements. It may be understood that, to implement the foregoing functions, the network elements, such as the terminal device and the VPN gateway, include corresponding hardware structures and/or software modules for executing the functions. A person of ordinary skill in the art should easily be aware that, with reference to the examples described in the embodiments disclosed in this specification, units and algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, functional modules of the terminal device, the VPN gateway, and the like may be divided according to the foregoing method examples. For example, the functional modules may be divided based on the functions, or two or more functions may be integrated in one processing module. The integrated module may be implemented in a form of hardware, or may be implemented in a form of a software functional module. It should be noted that the module division in this application is an example, and is merely logical function division, and there may be other division manners in actual implementation.

Figure 8A:
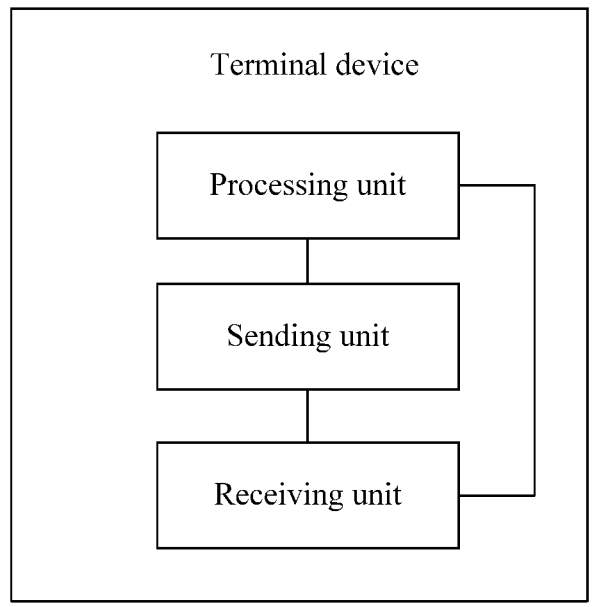
FIG. 8A is a schematic structural diagram 2 of a terminal device according to this application.

When the functional modules are divided based on the functions, FIG. 8A is a possible schematic structural diagram of the terminal device included in the foregoing embodiments. The terminal device includes a processing unit, a sending unit, and a receiving unit. The processing unit is configured to support the terminal device in performing steps 401, 402, 404, 405, and 412 in FIG. 4, steps 501, 502, and 503 in FIG. 5A, steps 501, 502, 503a, 506, and 503a in FIG. 5B, steps 605 and 606 in FIG. 6, and step 701 in FIG. 7. The sending unit is configured to support the terminal device in performing step 403 in FIG. 4 and step 702 in FIG. 7. The receiving unit is configured to support the terminal device in performing step 411 in FIG. 4 and step 604 in FIG.

6. For function descriptions of the corresponding functional modules, refer to all related content of the steps included in the foregoing method embodiments. Details are not described herein again.

Figure 8B:
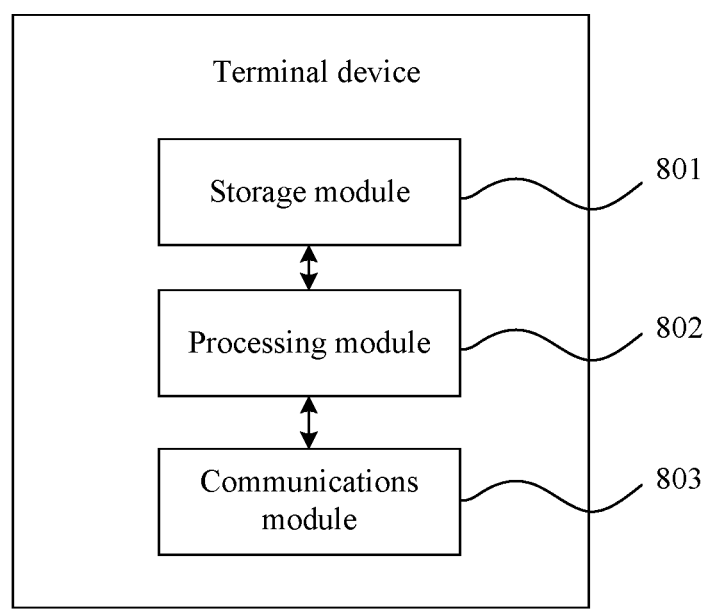
FIG. 8B is a schematic structural diagram 3 of a terminal device according to this application.

When the integrated unit is used, FIG. 8B is a possible schematic structural diagram of the terminal device included in the foregoing embodiments. The terminal device includes a processing module 802 and a communications module 803. The processing module 802 is configured to control and manage actions of the terminal device. For example, the processing module 802 is configured to support the terminal device in performing steps 401-405 and 411-412 in FIG. 4, steps 501-503 in FIG. 5A, steps 501, 502, 503a, 503b, and 506 in FIG. 5B, steps 604-606 in FIG. 6, and steps 701-702 in FIG. 7, and/or is used for other processes of the technologies described in this specification. The communications module 803 is configured to support the terminal device in communicating with another network entity, for example, communicating with a functional module or a network entity shown in FIG. 1. The terminal device may further include a storage module 801 configured to store program code and data of the terminal device.

The processing module 802 may be a processor or a controller, such as a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor/controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 803 may be a transceiver, a transceiver circuit, a communications interface, or the like. The storage module 801 may be a memory.

Figure 8C:
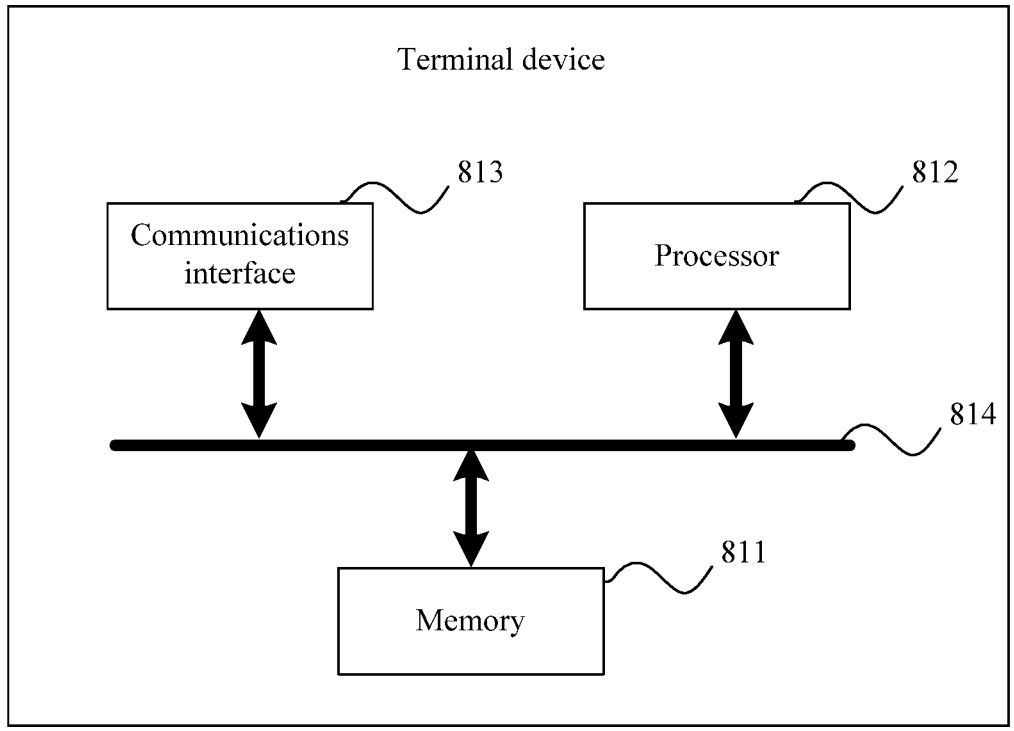
FIG. 8C is a schematic structural diagram 4 of a terminal device according to this application.

When the processing module 802 is a processor, the communications module 803 is a communications interface, and the storage module 801 is a memory, the terminal device included in this application may be a terminal device shown in FIG. 8C.

Referring to FIG. 8C, the terminal device includes a processor 812, a communications interface 813, a memory 811, and a bus 814. The communication interface 813, the processor 812, and the memory 811 are connected to each other by using the bus 814. The bus 814 may be a Peripheral Component Interconnect (PCI) bus, an Extended Industry Standard Architecture (EISA) bus, or the like. The bus may be classified into an address bus, a data bus, a control bus, and the like. For ease of representation, only one bold line is used to represent the bus in FIG. 8C, but this does not mean that there is only one bus or only one type of bus.

Figure 9A:
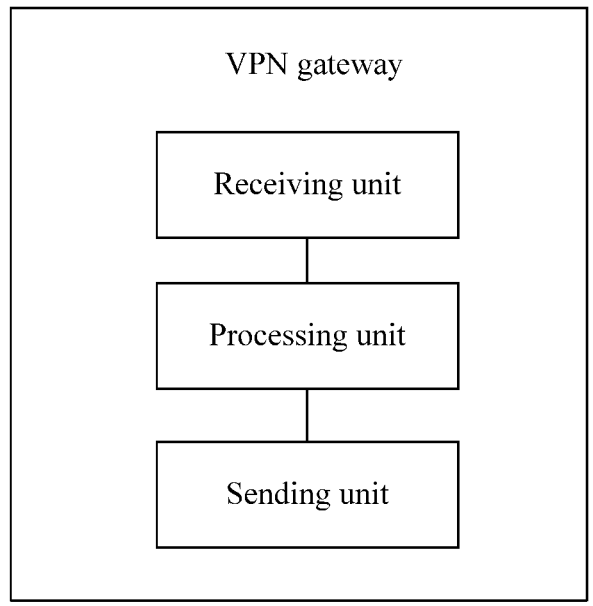
FIG. 9A is a schematic structural diagram 2 of a VPN gateway according to this application.

When the functional modules are divided based on the functions, FIG. 9A is a possible schematic structural diagram of the VPN gateway included in the foregoing embodiments. The VPN gateway includes a sending unit, a processing unit, and a receiving unit. The sending unit is configured to support the VPN gateway in performing step 411 in FIG. 4, and step 604 in FIG. 6. The processing unit is configured to support the VPN gateway in performing steps 406-411 in FIG. 4, steps 501 and 504-505 in FIG. 5A, steps 501, 504a, 504b, 505, and 506 in FIG. 5B, steps 601-603 in FIG. 6, and steps 703-704 in FIG. 7. The receiving unit is configured to support the VPN gateway in performing step 403 in FIG. 4, and step 702 in FIG. 7. For function descriptions of the corresponding functional modules, refer to all related content of the steps included in the foregoing method embodiments. Details are not described herein again.

Figure 9B:
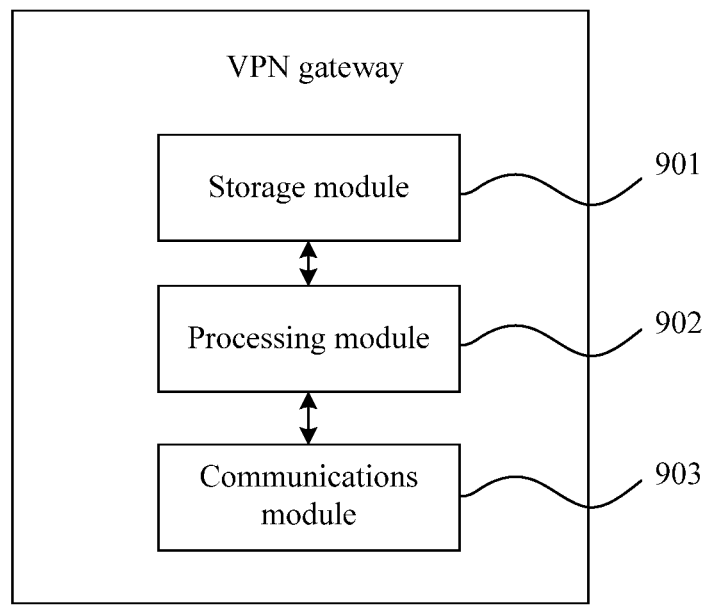
FIG. 9B is a schematic structural diagram 3 of a VPN gateway according to this application.

When the integrated unit is used, FIG. 9B is a possible schematic structural diagram of the VPN gateway included in the foregoing embodiments. The VPN gateway includes a processing module 902 and a communications module 903. The processing module 902 is configured to control and manage actions of the VPN gateway. For example, the processing module 902 is configured to support the VPN gateway in performing steps 403 and 406-411 in FIG. 4, steps 501 and 504-505 in FIG. 5A, steps 501, 504a, 504b, 505, and 506 in FIG. 5B, steps 601-604 in FIG. 6, and steps 702-704 in FIG. 7, and/or is used for other processes of the technologies described in this specification. The communications module 903 is configured to support the VPN gateway in communicating with another network entity, for example, communicating with a functional module or a network entity shown in FIG. 1. The VPN gateway may further include a storage unit 901 configured to store program code and data of the VPN gateway.

The processing module 902 may be a processor or a controller, for example, may be a CPU, a general-purpose process, a DSP, an ASIC, an FPGA or another programmable logic device, a transistor logic device, a hardware component, or any combination thereof. The processor/controller may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 903 may be a transceiver, a transceiver circuit, a communications interface, or the like. The storage module 901 may be a memory.

Figure 9C:
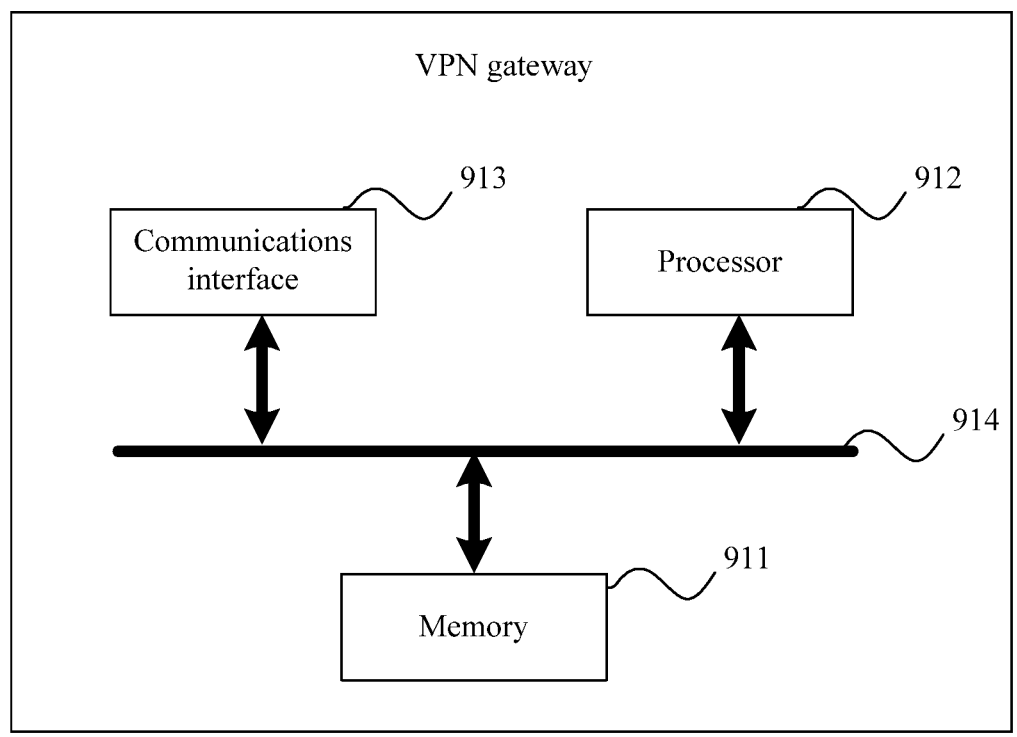
FIG. 9C is a schematic structural diagram 4 of a VPN gateway according to this application.

When the processing module 902 is a processor, the communications module 903 is a communications interface, and the storage module 901 is a memory, the VPN gateway included in this application may be a VPN gateway shown in FIG. 9C.

Referring to FIG. 9C, the VPN gateway includes a processor 912, a communications interface 913, a memory 911, and a bus 914. The communication interface 913, the processor 912, and the memory 911 are connected to each other by using the bus 914. The bus 914 may be a PCI bus, an EISA bus, or the like. The bus may be classified into an address bus, a data bus, a control bus, and the like. For ease of representation, only one bold line is used to represent the bus in FIG. 9C, but this does not mean that there is only one bus or only one type of bus.

Method or algorithm steps described with reference to the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

In an embodiment, the present disclosure further provides a computer storage medium, where the computer storage medium may store a program, and when the program is executed, some or all of the steps of the embodiments of the IPsec tunnel maintenance method provided in the present disclosure may be included. The storage medium may be a magnetic disk, an optical disc, a read-only memory (ROM), a random access memory (RAM), or the like.

As shown in FIG. 1, this application further provides a communications system, including the terminal device shown in FIG. 8A, FIG. 8B, or FIG. 8C, and the VPN gateway shown in FIG. 9A, FIG. 9B, or FIG. 9C.

A person skilled in the art may clearly understand that the technologies in this application may be implemented by using software and a required general-purpose hardware platform. Based on such an understanding, the technical solutions of this application essentially or the part contributing to other approaches may be implemented in a form of a software product. The computer software product may be stored in a storage medium, such as a ROM/RAM, a magnetic disk, or an optical disc, and includes several instructions for instructing a computer device (which may be a personal computer, a server, a VPN gateway, or the like) to perform the methods described in the embodiments or in some parts of the embodiments of this application.

For same or similar parts between the embodiments in this specification, mutual reference may be made between the embodiments. Especially, the apparatus embodiments are basically similar to the method embodiments, and therefore are described briefly. For related parts, refer to descriptions in the method embodiments.

The foregoing implementations of the present disclosure do not constitute a limitation on the protection scope of the present disclosure.

What is claimed is:

1. An Internet Protocol Security (IPsec) tunnel maintenance method implemented by a terminal device, comprising:
negotiating with a virtual private network (VPN) gateway to obtain security associations (SAs), wherein the negotiating uses a first Internet Protocol (IP) address of the terminal device and an Internet Key Exchange (IKE) protocol;
establishing an IPsec tunnel between the terminal device and the VPN gateway using the SAs, wherein the SAs comprise an IKE SA and an IPsec SA;
determining that an IP address of the terminal device is changed from the first IP address to a second IP address;
sending a first request packet to the VPN gateway to request the VPN gateway to update a first SA record using the second IP address, wherein the first request packet carries the second IP address and a first tunnel identifier, wherein the first tunnel identifier is generated using the first IP address, wherein the first SA record is stored in the VPN gateway, and wherein the first SA record comprises a correspondence between the SAs, the first IP address, and the first tunnel identifier;
generating a second tunnel identifier using the second IP address and a predefined algorithm, wherein the predefined algorithm is same as an algorithm used by the VPN gateway to generate the first tunnel identifier; and
replacing the first tunnel identifier in a second SA record with the second tunnel identifier, wherein the second SA record is stored in the terminal device, and wherein the second SA record stores a correspondence between the SAs and the first tunnel identifier.

2. The IPsec tunnel maintenance method of claim 1, wherein after replacing the first tunnel identifier in the second SA record with the second tunnel identifier, the IPsec tunnel maintenance method further comprises:
waiting to receive a first answer message from the VPN gateway; and
determining that the VPN gateway has completed updating the first SA record when the terminal device receives the first answer message from the VPN gateway, wherein the first answer message carries the second tunnel identifier; or
re-sending the first request packet to the VPN gateway when either the terminal device does not receive, within a preset time period, the first answer message from the VPN gateway or the first answer message does not carry the second tunnel identifier.

3. The IPsec tunnel maintenance method of claim 1, wherein after establishing the IPsec tunnel between the terminal device and the VPN gateway and before determining that the IP address of the terminal device changed from the first IP address to the second IP address, the method further comprises:
receiving, on the IPsec tunnel, an encrypted first IP packet from the VPN gateway, wherein the encrypted first IP packet carries the first tunnel identifier;
searching for the second SA record using the first tunnel identifier;
obtaining the IPsec SA in the second SA record; and
decrypting the encrypted first IP packet using the IPsec SA to obtain data from the encrypted first IP packet.

4. The IPsec tunnel maintenance method of claim 1, wherein after establishing the IPsec tunnel between the terminal device and the VPN gateway and before determining that the IP address of the terminal device changed from the first IP address to the second IP address, the method further comprises:
encrypting a second IP packet using the IPsec SA in the second SA record; and
sending an encrypted second IP packet to the VPN gateway on the IPsec tunnel, wherein the encrypted second IP packet carries the first tunnel identifier.

5. The IPsec tunnel maintenance method of claim 1, wherein the negotiating further comprises:
obtaining the IKE SA;
sending a second request packet to the VPN gateway after obtaining the IKE SA and before negotiating on the IPsec SA, wherein the second request packet comprises the first IP address, and wherein the second request packet requests the VPN gateway to create the first SA record based on using the first IP address and add the first IP address to the first SA record;
generating the first tunnel identifier using the first IP address and the predefined algorithm; and
creating the second SA record and adding the first tunnel identifier to the second SA record.

6. The IPsec tunnel maintenance method of claim 5, wherein the second request packet is a request message of a mode configuration mechanism, and wherein creating the second SA record comprises:
waiting to receive a second answer message from the VPN gateway; and creating the second SA record and adding the first tunnel identifier to the second SA record when the terminal device receives the second answer message from the VPN gateway, wherein the second answer message carries the first tunnel identifier.

7. An Internet Protocol Security (IPsec) tunnel maintenance method, implemented by a virtual private network (VPN) gateway, comprising:
   negotiating with a terminal device to obtain security associations (SAs), wherein the negotiating uses a first Internet Protocol (IP) address of the terminal device and an Internet Key Exchange (IKE) protocol;
   establishing an IPsec tunnel between the VPN gateway and the terminal device using the SAs, wherein the SAs comprise an IKE SA and an IPsec SA;
   receiving a first request packet from the terminal device, wherein the first request packet carries a second IP address and a first tunnel identifier;
   searching for a first SA record using the first tunnel identifier, wherein the first SA record comprises a correspondence between the first tunnel identifier, the first IP address, and the SAs;
   generating a second tunnel identifier using the second IP address and a predefined algorithm, wherein the predefined algorithm is the same algorithm used by the terminal device to generate the second tunnel identifier;
   replacing the first tunnel identifier in the first SA record with the second tunnel identifier; and
   replacing the first IP address in the first SA record with the second IP address.

8. The IPsec tunnel maintenance method of claim 7, wherein after replacing the first tunnel identifier in the first SA record with the second tunnel identifier and replacing the first IP address in the first SA record with the second IP address, the IPsec tunnel maintenance method further comprises:
   generating a first answer message, wherein the first answer message carries the second tunnel identifier;
   setting an IP header for the first answer message using the second IP address; and
   sending the first answer message to the terminal device on the IPsec tunnel.

9. The IPsec tunnel maintenance method of claim 7, wherein after establishing the IPsec tunnel between the VPN gateway and the terminal device, and before receiving the first request packet from the terminal device, the IPsec tunnel maintenance method further comprises:
   searching for the first SA record using the first tunnel identifier when the VPN gateway needs to send a first IP packet to the terminal device;
   encrypting the first IP packet using the IPsec SA in the first SA record;
   setting an IP header for the first IP packet using the first IP address in the first SA record; and
   sending the first IP packet to the terminal device on the IPsec tunnel, wherein the first IP packet carries the first tunnel identifier.

10. The IPsec tunnel maintenance method of claim 7, wherein after establishing the IPsec tunnel between the VPN gateway and the terminal device, and before receiving the first request packet from the terminal device, the IPsec tunnel maintenance method further comprises:
    receiving, on the IPsec tunnel, an encrypted second IP packet from the terminal device, wherein the encrypted second IP packet carries the first tunnel identifier;
    searching for the first SA record using the first tunnel identifier; and
    decrypting the second IP packet using the IPsec SA in the first SA record to obtain data in the second IP packet.

11. The IPsec tunnel maintenance method of claim 7, wherein the negotiating further comprises:
    obtaining the IKE SA;
    receiving a second request packet from the terminal device after obtaining the IKE SA and before negotiating on the IPsec SA, wherein the second request packet comprises the first IP address;
    generating the first tunnel identifier using the first IP address and the predefined algorithm; and
    creating the first SA record and adding the first tunnel identifier and the first IP address to the first SA record.

12. The IPsec tunnel maintenance method of claim 11, wherein the second request packet is a request message of a mode configuration mechanism, and wherein generating the first tunnel identifier comprises:
    determining whether the mode configuration mechanism is supported;
    generating the first tunnel identifier using the first IP address and the predefined algorithm, wherein the VPN gateway supports the mode configuration mechanism; and
    sending a second answer message to the terminal device, wherein the second answer message comprises the first tunnel identifier.

13. A terminal device, comprising:
    a communications interface circuit configured to send a first request packet to a virtual private network (VPN) gateway, wherein the first request packet carries a second IP address and a first tunnel identifier, wherein the first tunnel identifier is generated using a first IP address, wherein the first request packet requests the VPN gateway to update a first SA record using the second IP address, wherein the first SA record is stored in the VPN gateway, and wherein the first SA record comprises a correspondence between the SAs, the first IP address, and the first tunnel identifier;
    a hardware processor coupled to the communications interface circuit; and
    a hardware memory coupled to the hardware processor and the communications interface circuit using a bus and storing instructions that, when executed by the hardware processor, cause the terminal to be configured to:
       negotiate with a virtual private network (VPN) gateway to obtain security associations (SAs), using a first Internet Protocol (IP) address of the terminal device and an Internet Key Exchange (IKE) protocol;
       establish an Internet Protocol Security (IPsec) tunnel between the terminal device and the VPN gateway using the SAs, wherein the SAs comprise an IKE SA and an IPsec SA;
       determine that an IP address of the terminal device is changed from the first IP address to the second IP address;
       generate a second tunnel identifier using the second IP address and a predefined algorithm, wherein the predefined algorithm is same as an algorithm used by the VPN gateway to generate the first tunnel identifier of equal value; and
       replace the first tunnel identifier in a second SA record with the second tunnel identifier, wherein the second SA record is stored in the terminal device and wherein the second SA record stores the correspondence between the SAs and the first tunnel identifier.

14. The terminal device of claim 13, wherein the communications interface circuit is further configured to:
  wait to receive a first answer message from the VPN gateway after the terminal device replaces the first tunnel identifier in the second SA record with the second tunnel identifier;
  determine that the VPN gateway has completed updating the first SA record when the terminal device receives the first answer message from the VPN gateway, wherein the first answer message carries the second tunnel identifier; and
  re-send the first request packet to the VPN gateway either when the communications interface circuit does not receive the first answer message from the VPN gateway within a preset time period or the received first answer message does not carry the second tunnel identifier.

15. The terminal device of claim 14, wherein the communications interface circuit is further configured to receive, on the IPsec tunnel, a first IP packet from the VPN gateway after the IPsec tunnel with the VPN gateway is established and before the IP address of the terminal device changes from the first IP address to the second IP address, wherein the first IP packet carries the first tunnel identifier, and wherein the instructions further cause the terminal device to:
  search for the second SA record using the first tunnel identifier;
  obtain the IPsec SA in the second SA record; and
  decrypt the first IP packet using the IPsec SA to obtain data in the first IP packet.

16. The terminal device of claim 13, wherein the communications interface circuit is further configured to send an encrypted second IP packet to the VPN gateway on the IPsec tunnel, wherein the encrypted second IP packet carries the first tunnel identifier, and wherein the instructions further cause the terminal device to encrypt a second IP packet using the IPsec SA in the second SA record after establishing the IPsec tunnel with the VPN gateway, and before determining the IP address of the terminal device changed from the first IP address to the second IP address.

17. A virtual private network (VPN) gateway, comprising:
  a hardware processor;
  a hardware memory coupled to the processor and comprising instructions, that when executed by the hardware processor, cause the VPN gateway to:
    negotiate with a terminal device using a first Internet Protocol (IP) address of the terminal device and an Internet Key Exchange (IKE) protocol to obtain security associations (SAs);
    establish an Internet Protocol Security (IPsec) tunnel between the VPN gateway and the terminal device using the security associations (SAs), wherein the SAs comprise an IKE SA and an IPsec SA;
    search for a first SA record the using a first tunnel identifier, wherein the first SA record comprises a correspondence between the first tunnel identifier, the first IP address, and the SAs;
    generate a second tunnel identifier the using a second IP address and a predefined algorithm, wherein the predefined algorithm is the same as an algorithm used by the terminal device to generate the second tunnel identifier; and
    replace each of the first tunnel identifier in the first SA record with the second tunnel identifier and the first IP address in the first SA record with the second IP address; and
  a communications interface circuit coupled to the hardware memory and the hardware processor and configured to receive a first request packet from the terminal device, wherein the first request packet carries the second IP address and a first tunnel identifier.

18. The VPN gateway of claim 17, wherein the instructions further cause the VPN gateway to:
  generate a first answer message after replacing the first tunnel identifier in the first SA record with the second tunnel identifier and replacing the first IP address in the first SA record with the second IP address, wherein the first answer message carries the second tunnel identifier; and
  set an IP header for the first answer message using the second IP address, wherein the communications interface circuit is further configured to send the first answer message to the terminal device on the IPsec tunnel.

19. The VPN gateway of claim 17, wherein after establishing the IPsec tunnel between the VPN gateway and the terminal device and before receiving the first request packet sent by the terminal device, the instructions further cause the VPN gateway to:
  search for the first SA record using the first tunnel identifier when the VPN gateway needs to send a first IP packet to the terminal device;
  encrypt the first IP packet using the IPsec SA in the first SA record; and
  set an IP header for an encrypted first IP packet using the first IP address in the first SA record, wherein the communications interface circuit is further configured to send the encrypted first IP packet to the terminal device on the IPsec tunnel, and wherein the encrypted first IP packet carries the first tunnel identifier.

20. The VPN gateway of claim 17, wherein the communications interface circuit is further configured to, receive, on the IPsec tunnel, an encrypted second IP packet from the terminal device after establishing the IPsec tunnel between the VPN gateway and the terminal device and before receiving the first request packet from the terminal device, wherein the encrypted second IP packet carries the first tunnel identifier, and wherein the instructions further cause the VPN gateway to:
  search for the first SA record based on using the first tunnel identifier; and
  decrypt the encrypted second IP packet using the IPsec SA in the first SA record to obtain data in the second IP packet.

* * * * *

UNITED STATES PATENT AND TRADEMARK OFFICE
CERTIFICATE OF CORRECTION

PATENT NO. : 11,038,846 B2
APPLICATION NO. : 16/564327
DATED : June 15, 2021
INVENTOR(S) : Xiaoming Zhu, Wenxin Bai and Jin Kong Page 1 of 1

It is certified that error appears in the above-identified patent and that said Letters Patent is hereby corrected as shown below:

In the Claims

Claim 5, Column 24, Line 56: "record based on using the" should read "record using the"

Claim 13, Column 26, Line 48: "associations (SA)s, using a first" should read "associations (SA)s using a first"

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*